United States Patent [19]
Fujimoto

[11] Patent Number: 5,426,644
[45] Date of Patent: Jun. 20, 1995

[54] PARALLEL CODE TRANSMISSION METHOD AND APPARATUS OF THE SAME

[75] Inventor: Nobuhiro Fujimoto, Kawasaki, Japan

[73] Assignee: Fujitsu Limited, Kawasaki, Japan

[21] Appl. No.: 944,239

[22] Filed: Sep. 14, 1992

[30] Foreign Application Priority Data

Sep. 12, 1991 [JP] Japan .................... 3-232679

[51] Int. Cl.⁶ ............................................ H04J 3/06
[52] U.S. Cl. ............................................... 370/112
[58] Field of Search ................. 370/112, 102, 110.1, 370/111, 77, 84; 375/112, 36, 38; 341/100, 101; 359/158, 135

[56] References Cited

U.S. PATENT DOCUMENTS

| 3,708,783 | 1/1973 | Hedin | 340/146.1 |
| 4,520,480 | 5/1985 | Kawai | 370/100 |
| 4,727,541 | 2/1988 | Mori et al. | 370/112 |
| 5,136,587 | 8/1992 | Obana et al. | 370/112 |
| 5,150,364 | 9/1992 | Negus | 370/112 |
| 5,212,687 | 5/1993 | De la Bourdonnaye | 370/102 |
| 5,216,671 | 6/1993 | Nutter | 370/112 |

FOREIGN PATENT DOCUMENTS 0225025 6/1987 European Pat. Off. .
0436293 7/1991 European Pat. Off. .
2191662 12/1987 United Kingdom .

OTHER PUBLICATIONS

Patent Abstracts of Japan, vol. 6, No. 182 (E-131) & JP-A-57 095 737 (Fujitsu Ltd.) *abstract*.
Patent Abstracts of Japan, vol. 7, No. 119 (E-177)(1264) & JP-A-58 36 052 (Fujitsu K.K.) *abstract*.

Primary Examiner—Douglas W. Olms
Assistant Examiner—Dang Ton
Attorney, Agent, or Firm—Staas & Halsey

[57] ABSTRACT

A parallel transmission method includes a submethod of transmitting portion for transmitting parallel data of a plurality of channels as encoded data of a plurality of lines and a submethod of receiving portion for decoding parallel data of a plurality of lines from encoded data of the plurality of channels. The submethod of transmitting portion includes the steps of multiplying the frequency of a clock by a predetermined number to generate a multiplexing clock, separating input signals composed of parallel data of a plurality of channels and additional data for code transformation into a plurality of groups, transforming parallel data into serial data with the multiplexing clock, mutually substituting the resultant data of the plurality of channels from time to time, and generating encoded data containing the additional data of the plurality of lines. The submethod of receiving portion includes the steps of synchronizing encoded data of the plurality of lines with the additional data, substituting the resultant data of the plurality of lines in the inverse order of the transmitting portion, removing the additional data from the resultant data, successively arranging the resultant data of each group, dividing the frequency of a transmission clock by a predetermined number to generate an original clock, and transforming serial data of each group into parallel data.

14 Claims, 24 Drawing Sheets

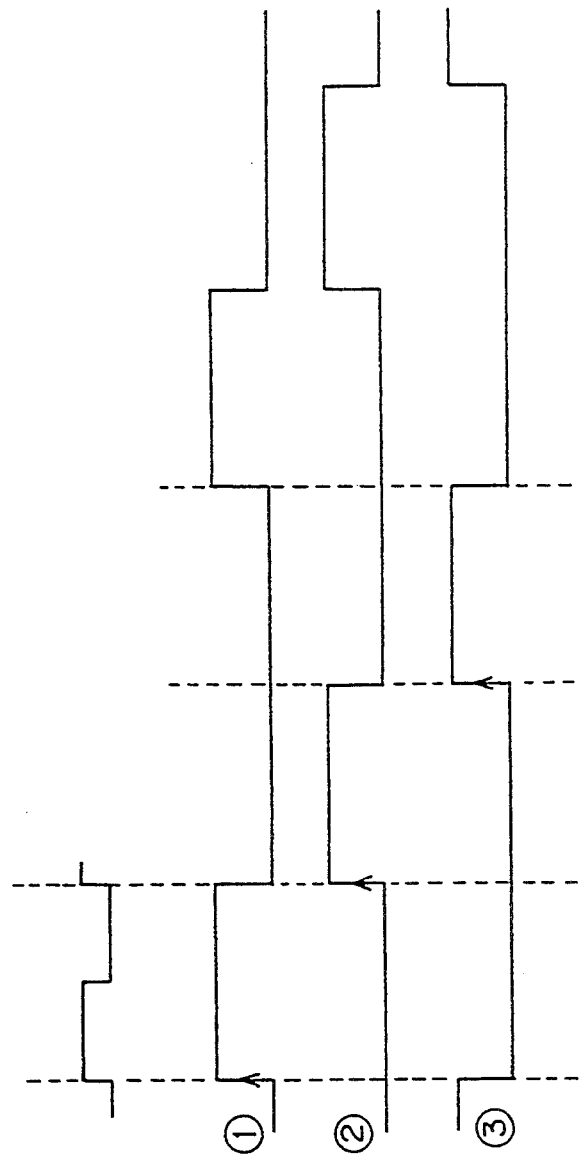
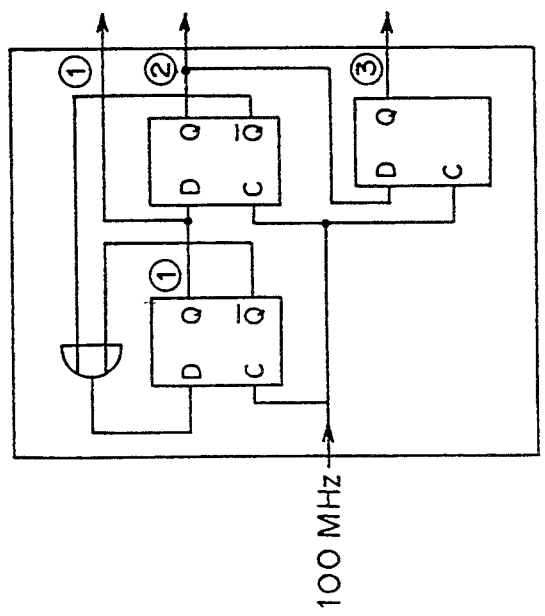
Fig. 2B

Fig. 7A REFERENCE DATA DELAYED BY DELAY CIRCUIT 15

Fig. 7B DATA OF TRANSMISSION LINE 62

Fig. 7C DATA OF TRANSMISSION LINE 6N

Fig. 7D FRAME SYNCHRONIZING SIGNAL FROM FRAME GENERATOR 22

Fig. 7E DATA OF TRANSMISSION LINE 62 DELAYED BY 7 BITS

Fig. 7F DATA OF TRANSMISSION LINE 6N DELAYED BY 5 BITS

INPUT DATA OF PARALLEL-SERIAL TRANSFORMING CIRCUIT

| TIME 1 | TIME 2 | TIME 3 |
|---|---|---|
| DATA 1 | DATA 1 | DATA 1 |
| DATA 2 | DATA 2 | DATA 2 |
| DATA 3 | DATA 3 | DATA 3 |
| DATA F | DATA 4 | DATA 4 |
| DATA 4 | DATA 5 | DATA 5 |
| DATA 5 | DATA 6 | DATA 6 |
| DATA 6 | DATA 7 | DATA 7 |
| DATA 7 | DATA F | DATA 8 |
| DATA 8 | DATA 8 | DATA 9 |
| DATA 9 | DATA 9 | DATA 10 |
| DATA 10 | DATA 10 | DATA 11 |
| DATA 11 | DATA 11 | DATA F |

Fig. 9A

ENCODED DATA OVER FIBER LINES

| FIBER LINE 1 | 1 2 3 F | 1 2 3 4 | 1 2 3 4 |
|---|---|---|---|
| FIBER LINE 2 | 4 5 6 7 | 5 6 7 F | 5 6 7 8 |
| FIBER LINE 3 | 8 9 10 11 | 8 9 10 11 | 9 10 11 F |

Fig. 9B

PARALLEL CODE TRANSMISSION METHOD AND APPARATUS OF THE SAME

BACKGROUND OF THE INVENTION

1. Field of the Invention

The present invention relates to a parallel code transmission method and an apparatus thereof. In particular, the present invention relates to a transmission line code processing method for transmitting signals between boards in a computer or a transmission processing unit or between two distant units.

2. Description of the Related Art

Conventionally, as computer techniques, signals are exchanged between internal boards of a computer and between external units in parallel. These signals are transmitted with pair cables and/or coaxial cables. However, the pair cables and coaxial cables have limitations with respect to bit rate and distance. In addition, it is known that skewing involved in a parallel data transmission (deviation of relative delay between channels) becomes a characteristic problem as the distance of the cables and the speed of data transmission increase. Thus, in consideration of the bandwidth and the transmission loss of the pair cables and coaxial cables, the maximum transmission bit rate and the maximum transmission distance thereof are at most of the orders of several 10 Mb/sec and 10 m, respectively. In other words, the use of these cables has been limited to applications of short distance and low bit rates. In addition, since the size, thickness, and weight of these cables are not suitable for applications of long distance, there are many problems to solve.

On the other hand, in recent years, as the processing speeds of the processors increase, those of computers proportionally increase. Thus, the processing speeds of signals exchanged between internal boards of a computer and between external units increase. In addition, from a flexibility point of view of the unit layout, the transmission distance of signals is becoming longer.

Moreover, with respect to transmission processing units which transmit these signals, the current mainstream of sound transmission services of the conventional public telephone networks is being replaced with broad-band integrated services digital networks (B-ISDN) which will provide full motion video transmission services requiring 1000 times wider transmission bandwidth. These B-ISDN technologies have been intensively studied worldwide. In these developing technologies, demands of high processing speeds of signal interfaces between internal boards and between external units and long distant transmission are becoming strong year after the year.

From the above-mentioned situation, in the field of computers and transmission processing units, there are demands for accomplishing interfaces which can transmit a large number of high speed signals for a long distance without deterioration of these signals. For these demands, optical parallel transmission techniques using optical fiber cables have been studied.

As so-called optical parallel transmission codes for transmitting parallel codes in optical level, for example, 4B6B code is presented in "Fundamental Study of Optical Parallel Transmission System", Document No. 2408, 70-th Anniversary National Conference of Institute of Electronics, Information and Communication Engineers (1987). This document describes a transmission line coding technique for encoding input data and transmitting the encoded data in parallel in optical level without a multiplexing process. In other words, this document does not mention techniques for simplifying the overall construction of the optical parallel link and for reducing the power consumption thereof. The simplification of the construction of the transmission line coding processing portion and the reduction of power consumption thereof are becoming important matters to solve in the conventional transmission systems as well as the optical parallel transmission system.

Generally, in the coding format "m+f" of the parallel-serial transformation (where m is the number of inputs, and f is "1" additional code), when codes are transformed with one parallel-serial transforming circuit, as the value m increases, the number of serial data increases. Thus, the transmission line speed increases. As a result, the circuit cannot be accomplished easily. On the other hand, when the value m is small, since the transmission line speed rise ratio given by $(m+1)/m$ increases, the transmission efficiency decreases. Moreover, when codes are transformed with a plurality of parallel-serial transforming circuits, the value m which is input to each parallel-serial transforming circuit decreases. Thus, the transmission line speed rise ratio given by $(m+1)/m$ increases.

SUMMARY OF THE INVENTION

An object of the present invention is to provide a transmission line code processing method and an apparatus thereof, for alleviating the restriction of parallel transmission line codes for use with parallel-serial transforming circuits, easily accomplishing the circuits in the event that the input parallel degree is large, and suppressing the transmission line speed rise ratio as low as possible.

To accomplish this object, the parallel code transmission apparatus according to the present invention comprises a sending portion for transmitting parallel data of a plurality of channels as encoded data of a plurality of lines and a receiving portion for decoding parallel data of a plurality of lines from encoded data of the plurality of channels, wherein the transmitting portion comprises a frequency multiplying circuit for multiplying the frequency of a clock so as to generate a multiplexing clock, a plurality of parallel-serial transforming circuits for separating input signals composed of parallel data of a plurality of channels and additional data for code transformation into a plurality of groups and for transforming the resultant parallel data into serial data with the multiplexing clock, and a first data substituting circuit for mutually substituting the resultant data of the plurality of channels of the plurality of parallel-serial transforming circuits in succession and for generating encoded data containing the additional data of the plurality of lines, and wherein the receiving portion comprises a plurality of synchronizing circuits for synchronizing encoded data of the plurality of lines with the additional data, a second data substituting circuit for substituting the resultant encoded data of the plurality of lines in the reverse order of the transmitting portion and for removing the additional data from the resultant data, arranging the resultant data of each group in succession, a frequency dividing circuit for dividing the frequency of a transmission line clock and for generating an original clock, and a plurality of serial-parallel transforming circuits for transforming the output signals of each group into parallel data with the clock.

Thus, the transmission line codes can be effectively transformed. The circuit scale and the power consumption can be decreased. In addition, the transmission line speed rise ratio can be decreased.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 2A–2C are block diagrams showing the construction of a transmitting portion according to a second embodiment of the present invention;

FIGS. 7A–7F are timing charts showing the operation of the synchronizing circuit;

FIGS. 9A and 9B are schematic diagrams describing a multiplexing process and an encoding process of the fourth embodiment;

DESCRIPTION OF THE PREFERRED EMBODIMENTS

Then, embodiments of the present invention will be described with reference to the accompanying drawings.

Figure 1:
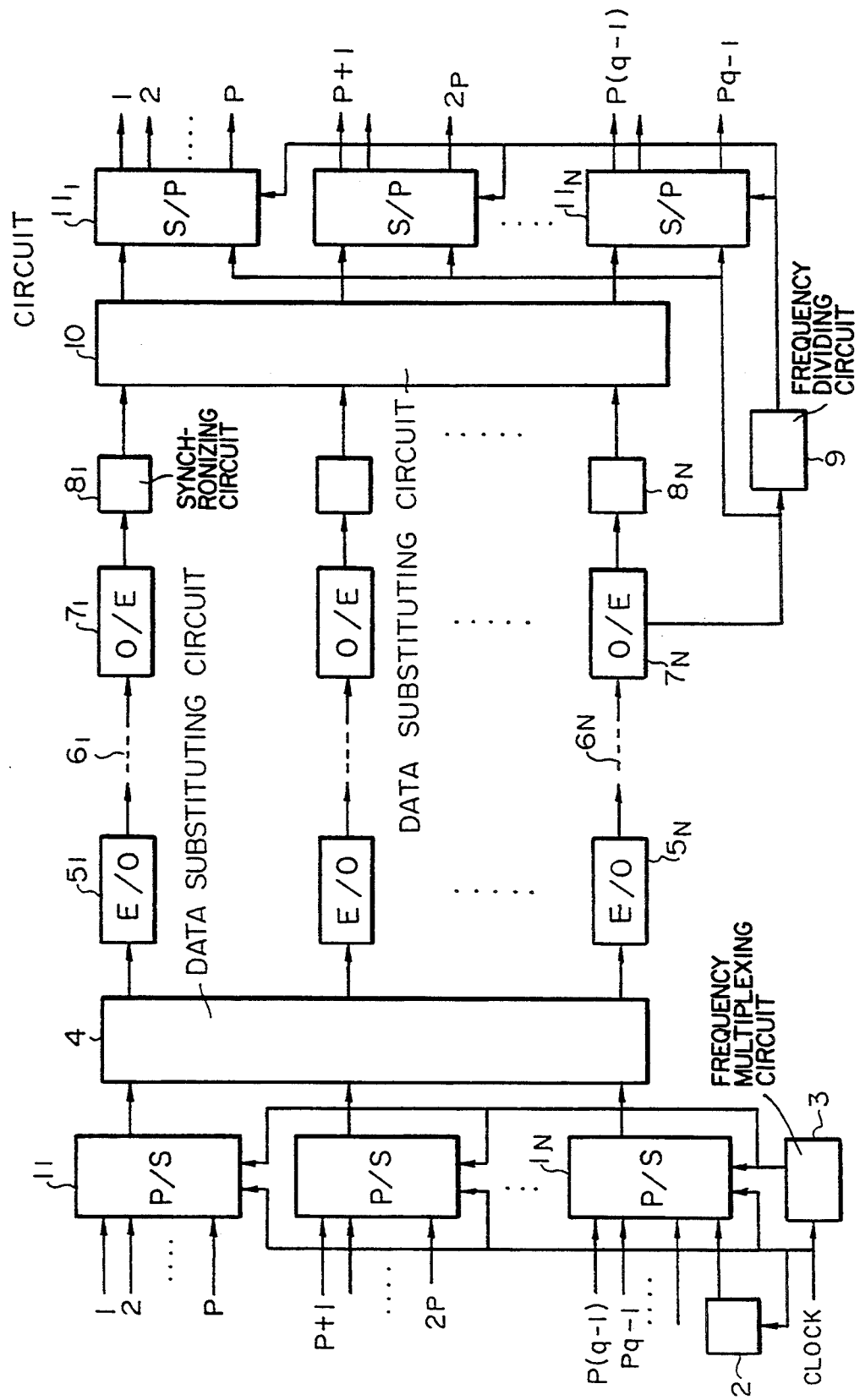
FIG. 1 is a block diagram showing the overall construction according to a first embodiment of the present invention.

FIG. 1 is a block diagram showing the overall construction of a first embodiment. In the figure, reference numerals $1_1$ to $1_N$ are parallel-serial transforming circuits (P/S). Reference numeral 2 is a frame information generating circuit. Reference numeral 3 is a clock frequency multiplying circuit. Reference numeral 4 is a data substituting circuit for substituting multiplexed data. Reference numerals $5_1$ to $5_N$ are electro-opto transforming circuits (E/O), These parts construct a transmitting portion. Reference numerals $7_1$ to $7_N$ are optical-electric transforming circuits (O/E). Reference numerals $8_1$ to $8_N$ are synchronizing circuits. Reference numeral 9 is a clock frequency dividing circuit. Reference numeral 10 is a data substituting circuit for substituting multiplexed data. Reference numerals $11_1$ to $11_N$ are serial-parallel transforming circuits (S/P). These parts construct a receiving portion.

In the transmitting portion, the plurality of parallel-serial transforming circuits $1_1$ to $1_N$ transform parallel data 1 to p, p+1 to 2p, ..., and p(q−1) to pq−1, where a plurality of channels are separated into a plurality of groups, into multiplexed data of serial signals. The frame generating circuit 2 generates frame information which represents the position of a multiplexed frame. The clock frequency multiplying circuit 3 multiplies the frequency of the input clock by a predetermined number.

Thus, in the transmitting portion, the multiplexing clock where the frequency of the input clock is multiplied by the predetermined number is generated.

The data substituting circuit 4 mutually substitutes the transformed results of the plurality of parallel-serial transforming circuits 11 to 1N from time to time and generates encoded data of the plurality of lines, each of which contains frame information as additional data. The respective encoded data are output to the plurality of electro-opto transforming circuits $5_1$ to $5_N$. The respective outputs of the electro-opto transforming circuits $5_1$ to $5_N$ are sent to the optical fiber lines $6_1$ to $6_N$.

In other words, in the transmitting portion, the input signals composed of parallel data of a plurality of channels and the additional data necessary for code transformation are separated into a plurality of groups. The parallel data is transformed into serial data by the multiplexing clock. The transformed results of the plurality of circuits are mutually substituted from time to time. Thereafter, encoded data of the plurality of circuits, each of which contains the additional data, are generated. Consequently, parallel data of the plurality of circuits are transmitted as encoded data.

On the other hand, in the receiving portion, the plurality of opto-electro transforming circuits $7_1$ to $7_N$ transform respective inputs of the optical fiber lines $6_1$ to $6_N$ into electric signals. The plurality of synchronizing circuits $8_1$ to $8_N$ synchronize the received multiplexed data in accordance with the frame information being inserted.

Thus, in the receiving portion, the encoded data of the plurality of circuits are synchronized by the additional data.

The data substituting circuit 10 substitutes the encoded data of the plurality of lines in the reverse order of the transmitting portion. In addition, the substituting circuit 10 removes the frame information as the additional information and arranges the resultant data of the plurality of circuit from time to time. Thus, the arrangement of the original multiplexed data is restored.

As described above, in the receiving portion, the encoded data of the plurality of lines are substituted in the reverse order of the transmitting portion. In addition, the additional data is removed from the substituted data. The resultant data f the plurality of lines are arranged from time to time. From he encoded data of the plurality of lines, parallel data of the plurality of channels are decoded.

The frequency dividing circuit 9 divides the frequency of the multiplexing clock obtained from the opto-electro transforming circuit $7_N$ by a predetermined value and generates the original clock.

As described above, in the receiving portion, the frequency of transmission line clock is divided by the predetermined number and thereby the original clock is generated.

The plurality of serial-parallel transforming circuits 111 to 11N transform respective multiplexed data from the data substituting circuit 10 into parallel data of 1 to p, p+1 to 2p, ..., and p(q−1) to pq−1 by using the multiplexing clock and the clock from the frequency dividing circuit 9.

As described above, in this embodiment, data is not encoded whenever multiplexed in all the transmission lines, but in one of them. Thus, when these data are transmitted in parallel, they are separated into multiplexed data and encoded data over the optical transmission lines. However, in this embodiment, since they are mutually substituted by the data substituting circuit, encoded data is always present once in a particular time period of each data transmission of each optical fiber line.

Thus, even if the parallel degree of input signals is large, the rise ratio of the transmission speed can be decreased to a smaller value. For example, although p: 1 parallel-serial transforming circuits shown in FIG. 1 are used, data with the parallel degree of pq−1 can be transmitted in parallel. In this case, the clock speed of the transmission line is suppressed to p times the speed of the original clock.

To substitute multiplexed data in such a way that the above-mentioned encoded portion is always present once in a particular time period of each data transmission, several techniques can be used. One of these techniques will be described as a second embodiment of the present invention.

Figure 2A:
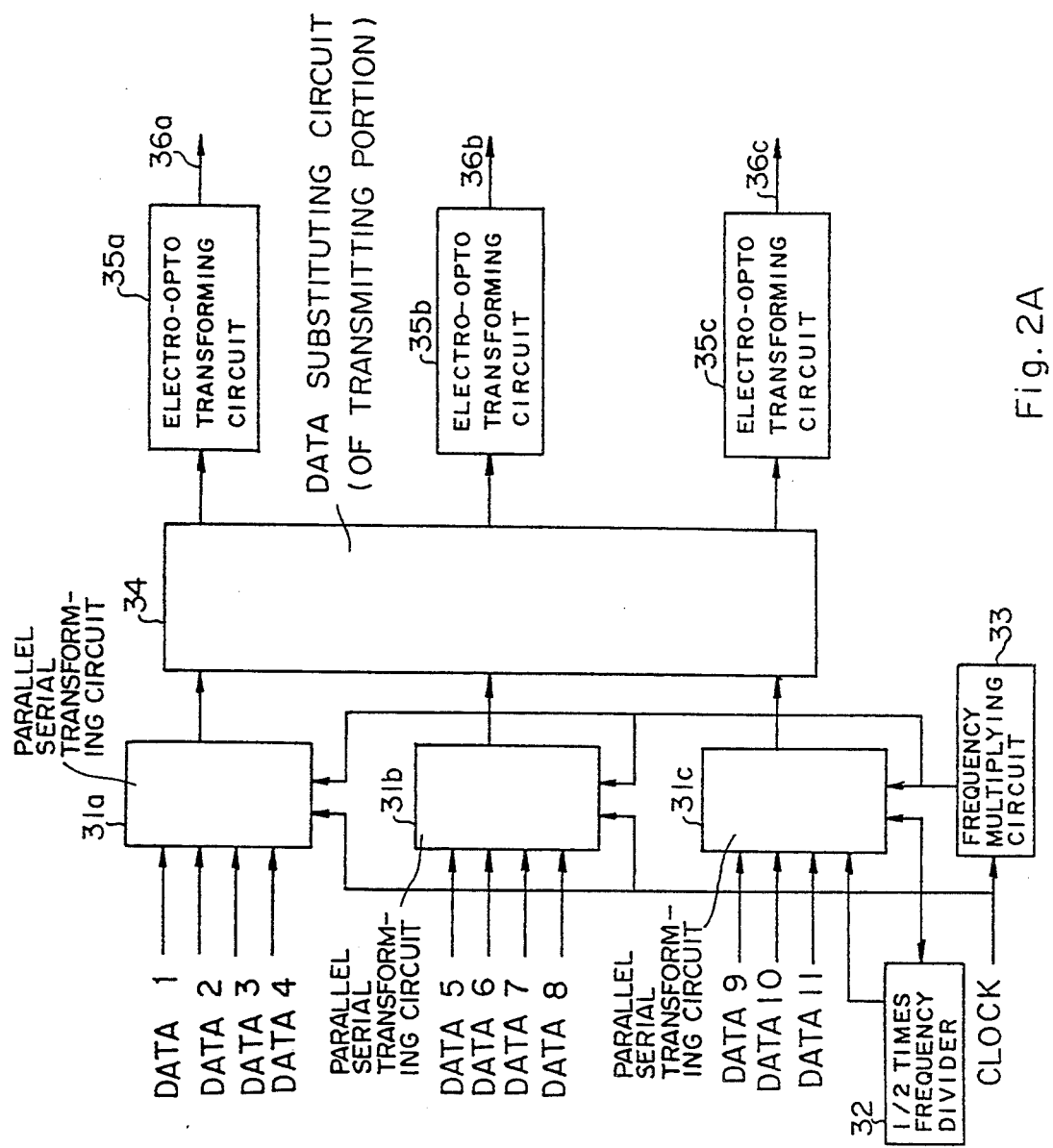

FIG. 2A shows the construction of a transmitting portion of the second embodiment of the present invention. Reference numerals 31a to 31c are parallel-serial transforming circuits. Reference numeral 32 is a ½ frequency dividing circuit. Reference numeral 33 is a clock frequency multiplying circuit. Reference numeral 34 is a data substituting circuit for the transmitting portion. Reference numerals 35a to 35c are electro-opto transforming circuits. Reference numerals 36a to 36c are optical fiber lines.

Figure 3:
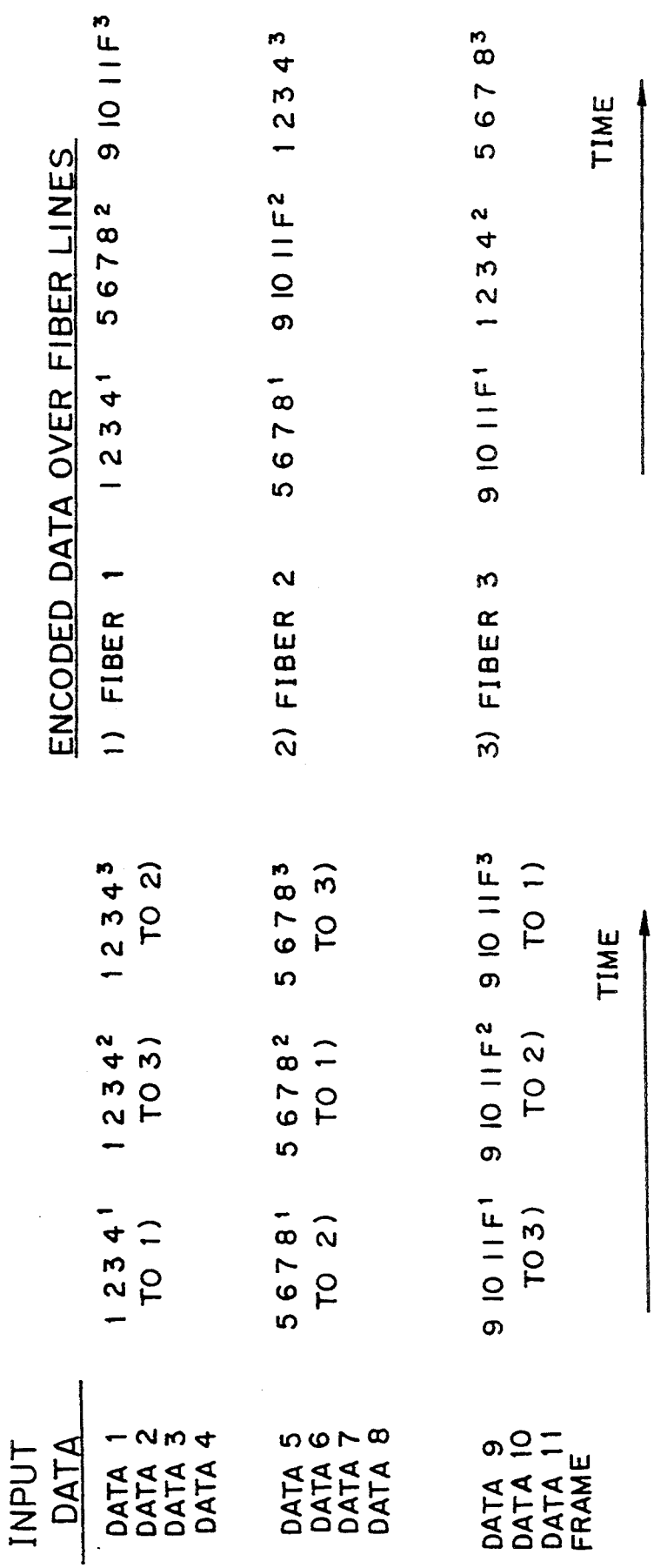
FIG. 3 is a diagram describing a substituting process of multiplexed data in the second embodiment.

FIG. 3 describes a substituting technique of multiplexed data of the second embodiment shown in FIG. 2A.

The second embodiment represents the case where p =3 and q=4 in the first embodiment. Thus, in the second embodiment, the data input parallel degree is 11.

Figure 2C:
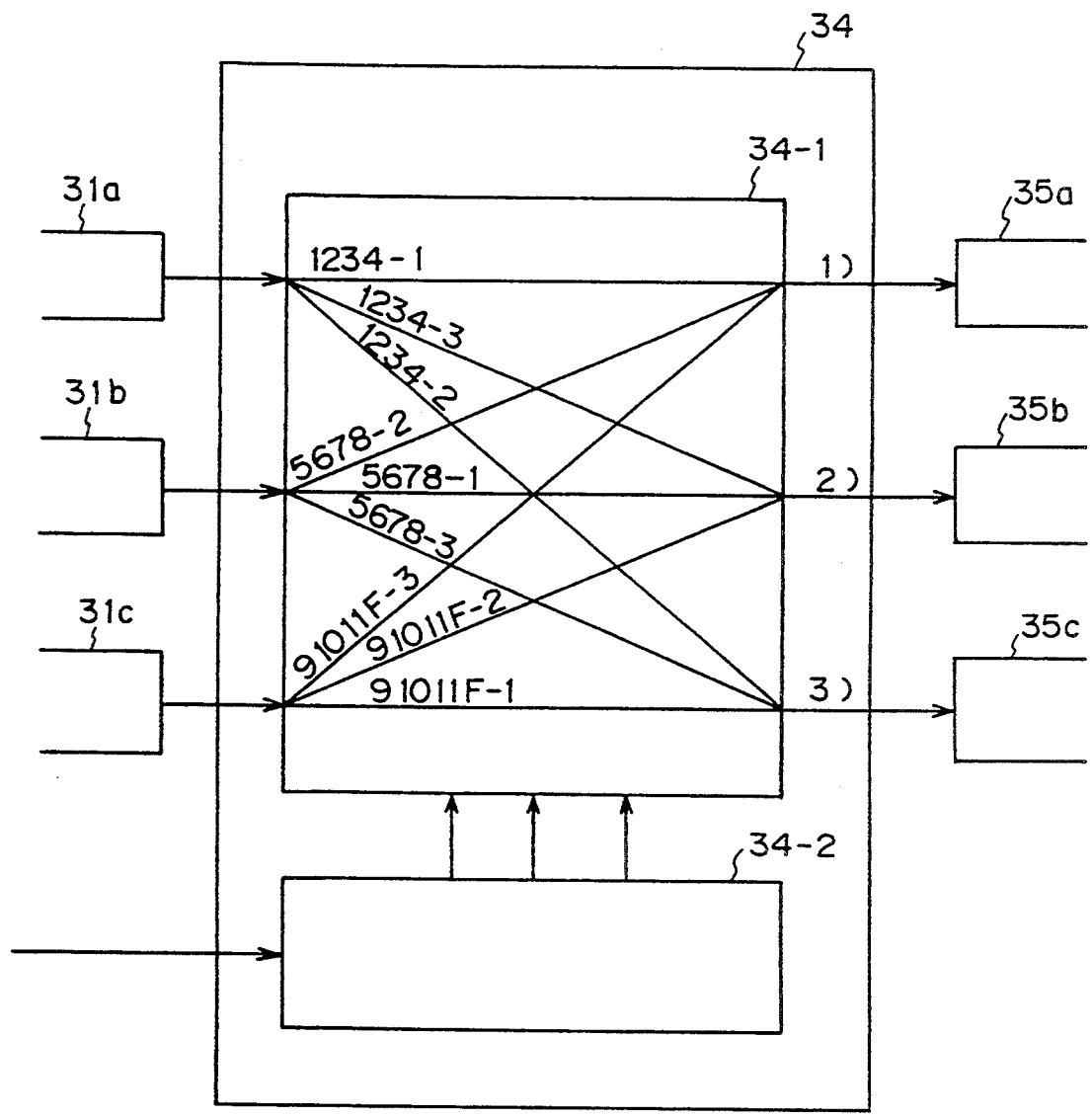

The parallel-serial transforming circuit 31a transforms parallel data of data 1 to data 4 into serial data by using a clock and a 4 times frequency clock received from the frequency multiplying circuit 33. Thus, data of 1234-1, 1234-2, and 1234-3 are generated as shown in FIG. 2C. These data are substituted in the order of 1), 3), and 2) by the data substituting circuit 34. The resultant data are sent to the electro-opto transforming circuits 35a, 35c, and 35b. Likewise, the parallel-serial transforming circuit 31b transforms parallel data of data 5 to data 8 into serial data. As shown in the FIG. 2C, data of 5678-1, 5678-2, and 5678-3 are generated. These data are also substituted in the order of 2), 1), and 3) by the data substituting circuit 34. The resultant data are sent to the electro-opto transforming circuits 35b, 35a, and 35c. The parallel-serial transforming circuit 31c transforms parallel data of data 9 to data 10 and a frame signal into serial data. Thus, as shown in FIG. 2C, data of 91011F-1, 91011F-2, and 91011F-3 are generated. These data are also substituted in the order of 3), 2), and 1) by the data substituting circuit 34. The resultant data are sent to the electro-opto transforming circuits 35c, 35b, and 35a. The electro-opto transforming circuits 35a, 35b, and 35c transform these electric signals into optical signals and send the resultant signals to the optical fiber lines 36a, 36b, and 36c, respectively.

FIG. 2B shows the configuration of the data substituting circuit 34 for substituting multiplexed data as described above.

As shown in FIG. 2C, the substituting circuit 34 comprises a 3×3 matrix switch 34-1 and a substituting control unit 34-2. The above described substituting control unit 34-2 comprises a 311 dividing circuit shown in FIG. 2B(a). The 3/1 dividing circuit comprises three DFFs 1, 2, and 3, and an OR gate. Each of the DFFs 1, 2, and 3 divides a clock (for example, 100 MHz) by 3, each division being performed by 1 clock delay, and outputs a signal comprising three phases shown in FIG. 2B(b). Then, three types of timing signals are sequentially switched and outputted to the 3×3 matrix switch 34-1 by the substituting control unit 34-2.

Multiplexed serial data are inputted from the parallel-serial converting circuits 31a, 31b, and 31c to the 3×3 matrix switch 34-1. The 3×3 matrix switch 34-1 outputs the data according to the three types of timing signals sequentially switched based on the above described clock and inputted. At the first timing, the data 1234-1 inputted from the parallel-serial converting circuit 31a are outputted to system 1, the data 5678-1 inputted from the parallel-serial converting circuit 31b are outputted to system 2, and the data 91011F-1 inputted from the parallel-serial converting circuit 31c are outputted to system 3. At the second timing, the data 1234-2 inputted from the parallel-serial converting circuit 31a are outputted to system 3, the data 5678-2 inputted from the parallel-serial converting circuit 31b are outputted to system 1, and the data 91011F-2 inputted from the parallel-serial converting circuit 31c are outputted to system 2. At the third timing, the data 1234-3 inputted from the parallel-serial converting circuit 31a are outputted to system 2, the data 5678-3 inputted from the parallel-serial converting circuit 31b are outputted to system 3, and the data 91011F-3 inputted from the parallel-serial converting circuit 31c are outputted to system 1. Thus, at each substitution timing in a cycle of three timings, the 3×3 matrix switch is switched to substitute data in three systems.

Figure 4:
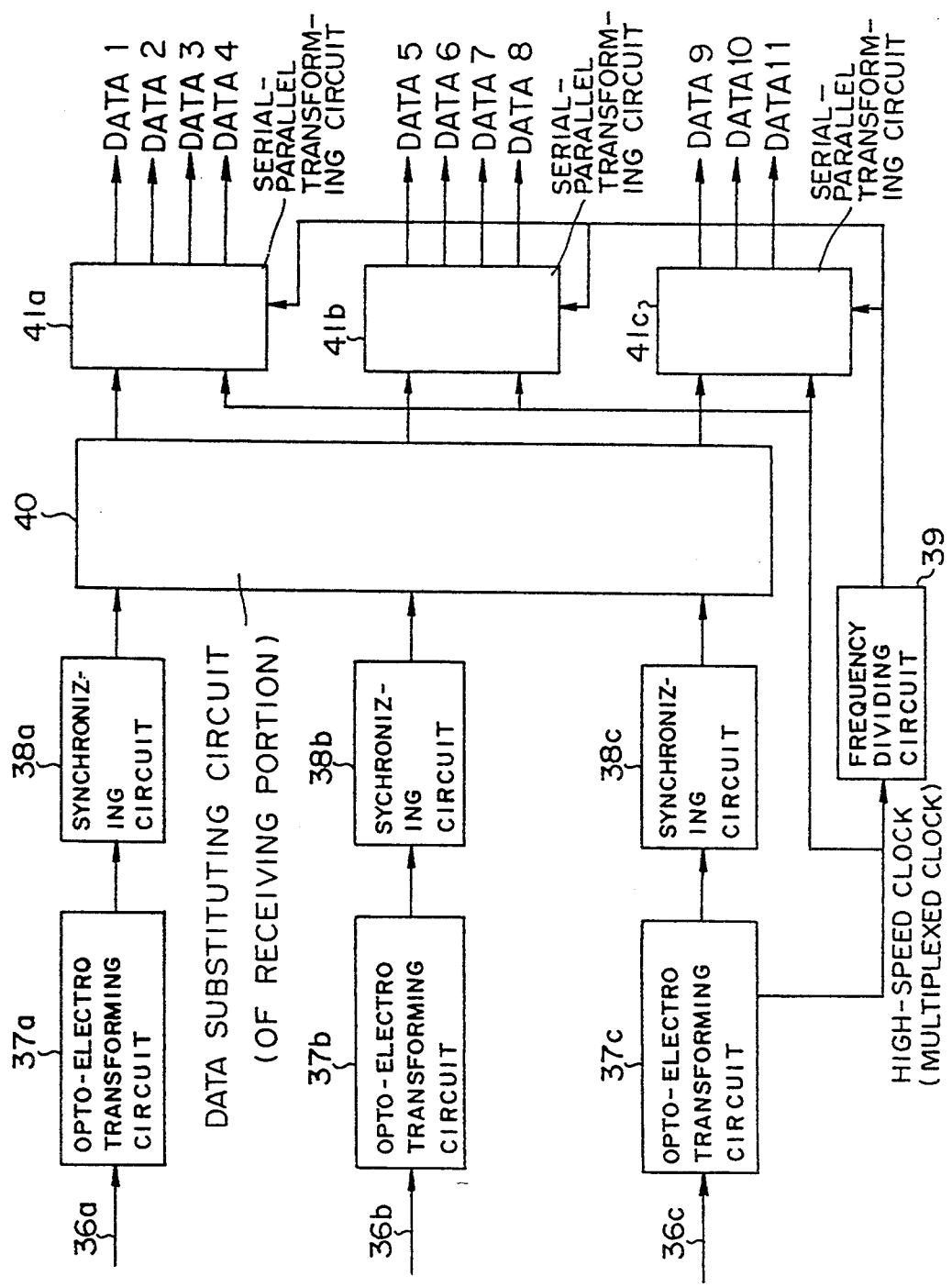
FIG. 4 is a block diagram showing the construction of a receiving portion of the second embodiment.

FIG. 4 shows the construction of a receiving portion of the second embodiment. Reference numerals 37a to 37c are opto-electro transforming circuits. Reference numerals 38a to 38c are synchronizing circuits. Reference numeral 39 is a high speed clock (multiplexing clock) frequency dividing circuit. Reference numeral 40 is a data substituting circuit for the receiving portion. Reference numerals 41a to 41c are parallel-serial transforming circuits.

The opto-electro transforming circuits 37a to 37c transform optical signals received from the optical fiber lines 36a to 36c into electric signals. The synchronizing circuits 38a to 38c synchronize these signals (multiplexed data) by using frame information (F) contained therein and output the resultant signals to the data substituting circuit 40. The data substituting circuit 30 substitutes the received data in the reverse order of the data substituting circuit shown in FIG. 3. In addition, the data substituting circuit 30 removes the frame information and reproduces parallel data of data 1 to data 4, data 5 to data 8, and data 9 to data 11.

Figure 5:
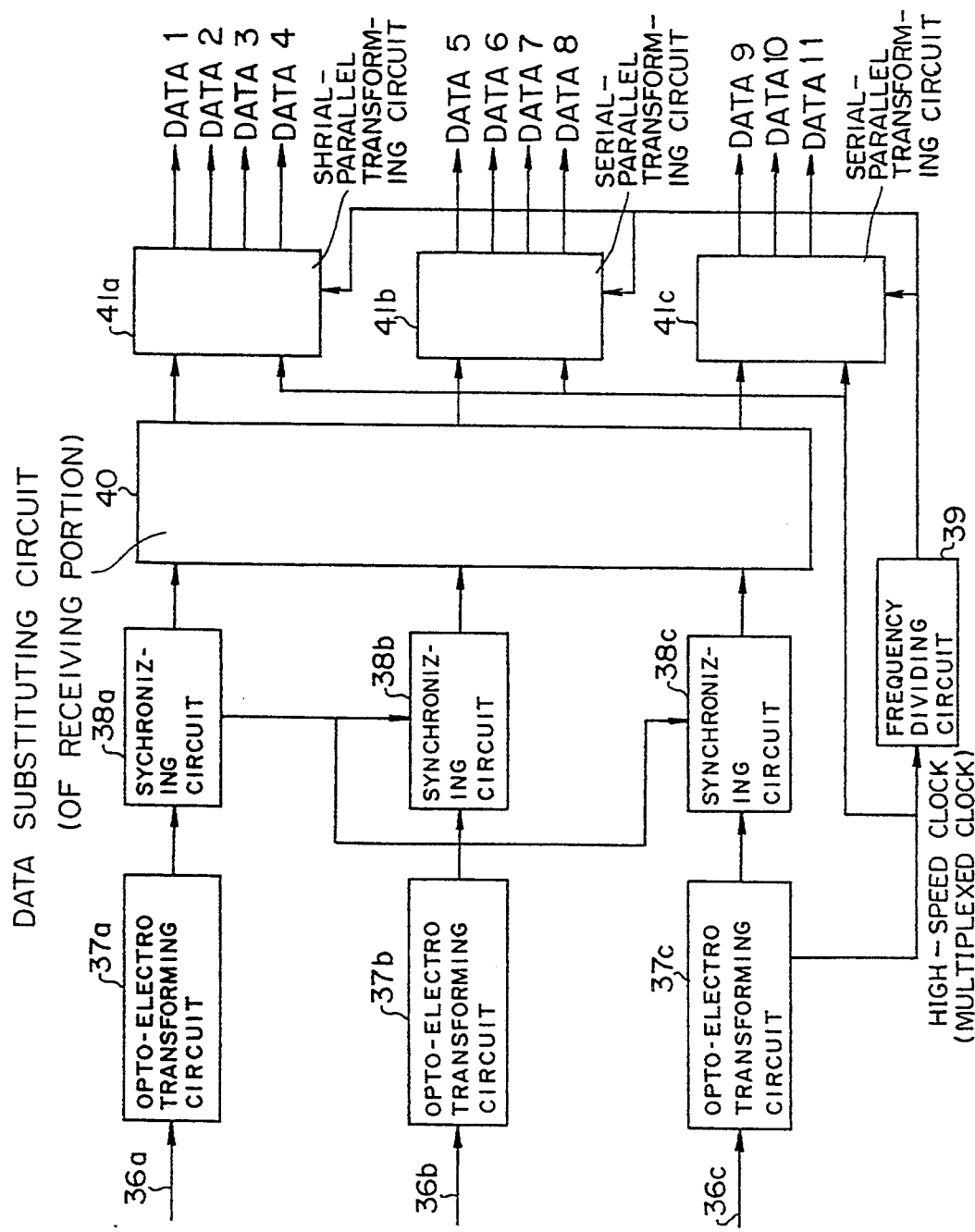
FIG. 5 is a block diagram showing the construction of a receiving portion of according to a third embodiment of the present invention.

FIG. 5 shows an example of construction where data of one transmission line is synchronized and then data of other transmission lines are synchronized therewith. The operation of this construction will be described as a third embodiment. In FIG. 5, for simplicity, the same portions as FIG. 4 use the same reference numerals thereof.

In FIG. 5, the synchronizing circuit 38b of the second transmission line and the third synchronizing circuit 38c of the third transmission line synchronize the data of the respective circuits in accordance with the synchronizing information detected by the synchronizing circuit 38a of the first transmission line. Except for this point, the operation of the third embodiment is the same as that of the second embodiment shown in FIG. 4.

According to the third embodiment shown in FIG. 5, the constructions of the synchronizing circuits 38b and 38c can be simplified. As a result, the overall circuit scale of the apparatus can be reduced.

Figure 6:
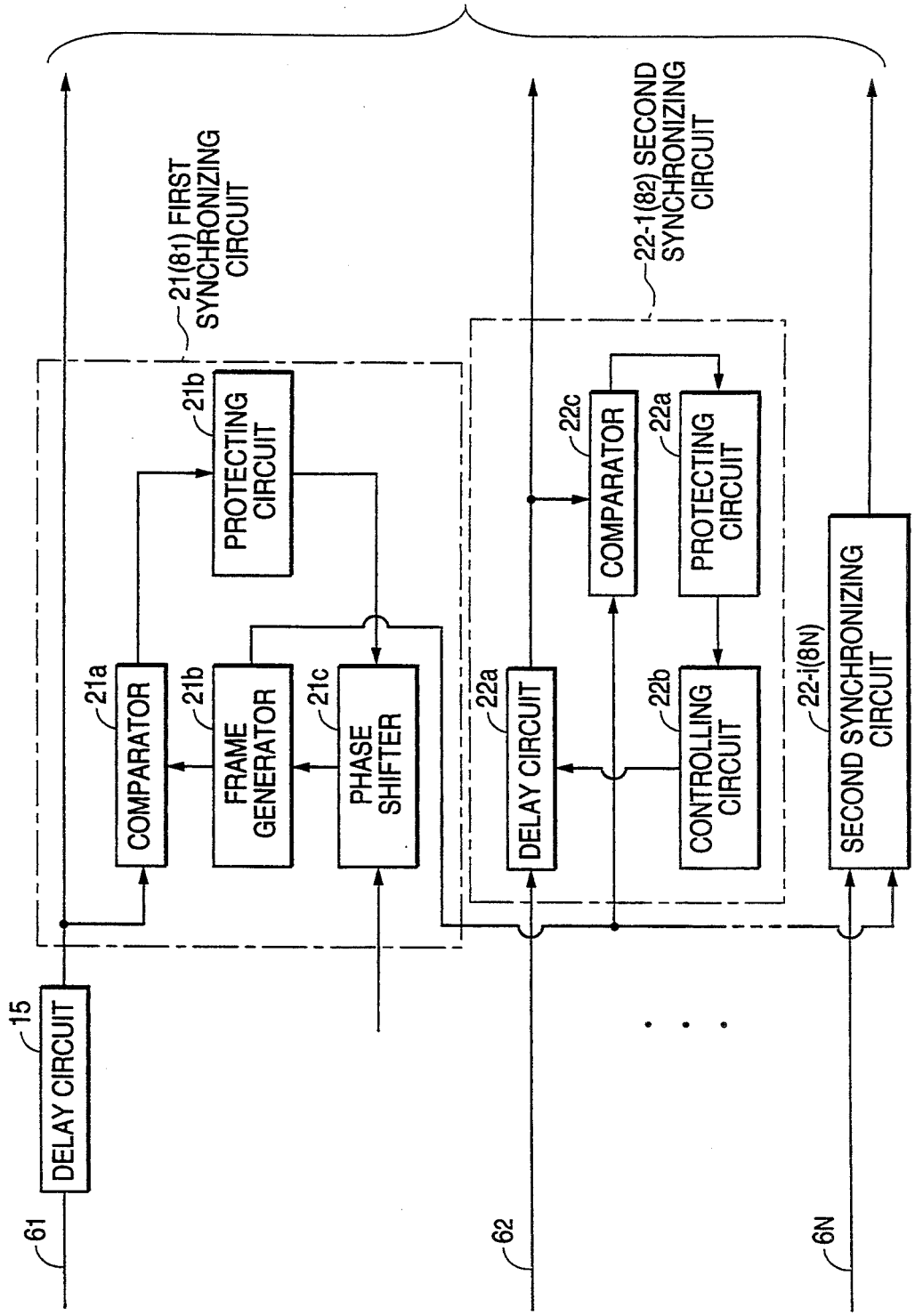
FIG. 6 is a block diagram describing a synchronizing circuit.

Next, the synchronizing circuits 38a–38c will be described in detail. FIG. 6 shows examples of multiple units as the basic construction of the synchronizing circuit.

In the figure, reference numerals $6_1$ to $6_N$ are transmission lines. Reference numeral 21 ($8_1$) is a first synchronizing circuit. Reference numerals 22-1 to 22-i ($8_2$ to $8_N$) are second synchronizing circuits. In this construction, the transmission line $6_1$ is used as a reference line. A delay circuit 15 which provides a delay larger than the skew which takes place over the transmission line $6_1$ is disposed thereon.

The first synchronizing circuit 21 comprises a comparator 21a, a frame generator 21b, a phase shifter 21c, and a protecting circuit 21d. On the other hand, each of the second synchronizing circuits 22-1 to 22-i comprises a delay circuit 22a, a control circuit 22b, a comparator 22c, and a protecting circuit 22d. FIG. 6 shows only the second synchronizing circuit 22-1 disposed over the transmission line $6_2$. Each construction of the second synchronizing circuits 22-3 to 22-N disposed over the transmission lines $6_3$ to $6_N$ is the same as that of the second synchronizing circuit 22-2 disposed over the transmission line $6_2$.

Next, with reference to the timing chart of FIGS. 7A–7F the operations of the first synchronizing circuit 21 and the second synchronizing circuit 22-1 will be described. First, a delay which is larger than the skew which likely takes place has been given to data of the reference line, that is, the transmission line $6_1$ (hereinafter, this data is referred to as reference data) by the delay circuit 15. Now, assume that data which are transmitted to the transmission lines $6_1$ to $6_N$ are mB1F code. The mB1F code consists of data of m bits and frame information F (additional code) of 1 bit.

FIG. 7A shows reference data which has been delayed by the delay circuit 15. FIG. 7B shows data transmitted over the transmission line $6_2$. FIG. 7C shows data transmitted over the transmission line $6_N$. All these data have different delays over respective transmission lines due to skew affects of different length of optical fiber lines and different refraction indexes thereof.

FIG. 7D shows a frame synchronous signal which is output from the frame generator 21b of the first synchronizing circuit 21. This frame synchronous signal is sent to the second synchronizing circuits 22-1 to 22-i.

In the second synchronizing circuits 22-1 to 22-i, the comparator 22c compares the frame synchronizing signal with the data received through the transmission lines $6_2$ to $6_N$. Until the frame F of the data of the transmission lines $6_2$ to $6_N$ accords with the frame synchronizing signal (see FIGS. 7D, E, and F), the control circuit 22b continues to activate the delay circuit 22a. Thus, the data received through the transmission line $6_2$ (FIG. 13B) is delayed by 7 bits and thereby data as shown in FIG. 7E takes place. On the other hand, the data received through the transmission line $6_N$ (FIG. 7C) is delayed by 5 bits and thereby data as shown in FIG. 7F takes place.

As described above, by using the synchronous information of the reference data, when data other than the reference data are delayed by a predetermined number of bits (7 bits for the data of the transmission line $1_1$ and 5 bits for the data of the transmission line $1_N$), the skew effects can be removed. Thus, the phases of frames of all data can be matched and data of all transmission lines can be synchronized.

When multiplexed data is substituted with encoded data, the positions of frame synchronizing signals deviate by a predetermined number of bits in the data substituting order in a predetermined time period from line to line. In this case, the controlling circuit 22b compensates these deviations and calculates the number of bits necessary for the delay.

Figure 8A:
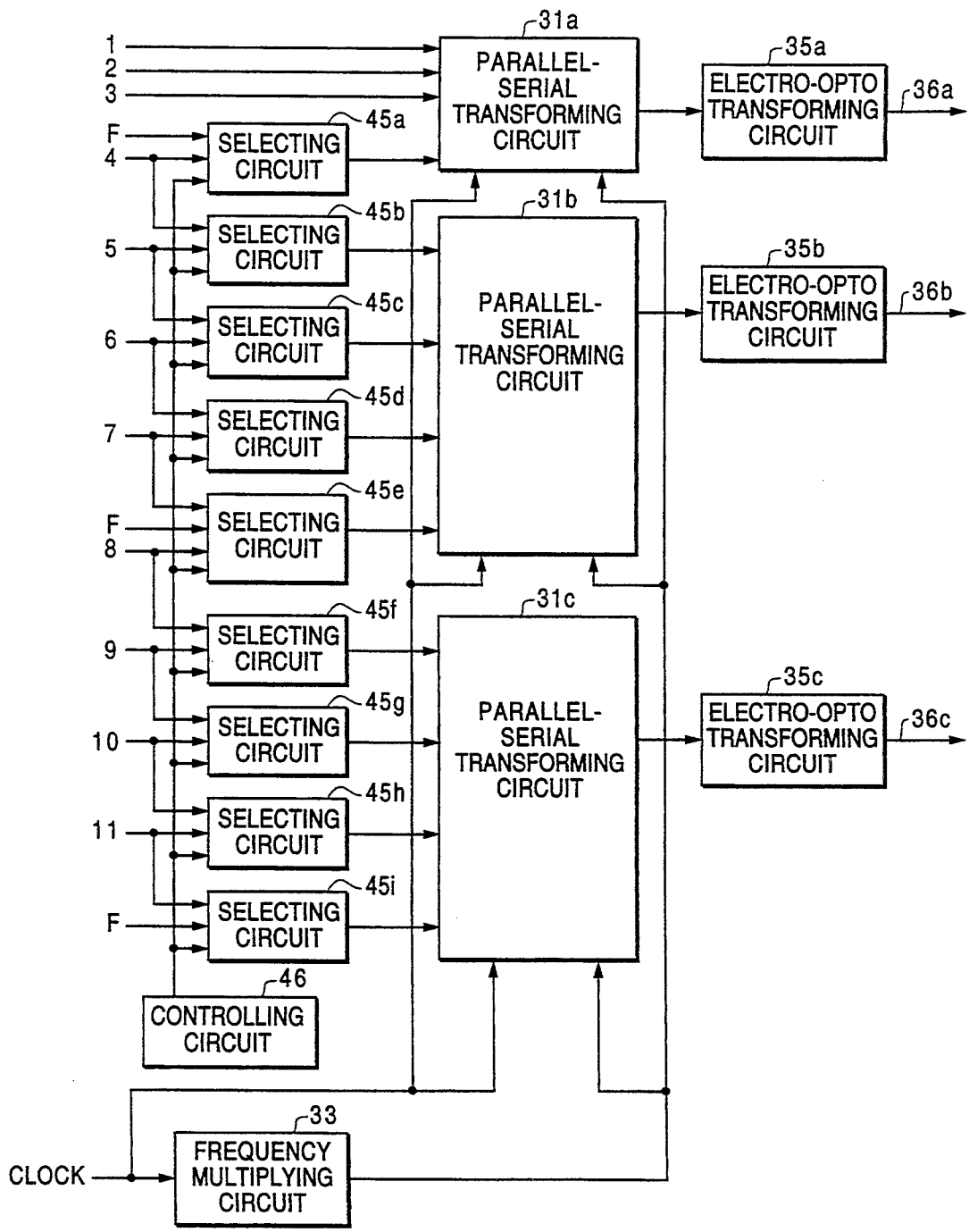
FIGS. 8A and 8B are block diagrams showing the construction of a transmitting portion of according to a fourth embodiment of the present invention.

Next, another example of the construction for substituting multiplexed data will be described as a fourth embodiment. FIG. 8A shows the construction of a transmitting portion of the fourth embodiment. In this construction, when data is multiplexed, it is substituted. In FIG. 8A, for simplicity, the same portions the same as FIGS. 2A–2C use the same reference numerals thereof. Reference numerals 45a to 45i are selecting circuits. Reference numeral 46 is a controlling circuit for controlling the selection of an input of each selecting circuit.

FIGS. 9A and 9B describe a multiplexing process and an encoding process of the fourth embodiment shown in FIG. 8A. Like the case shown in FIG. 3, since p=3 and q=4, the data input parallel degree is 11.

In FIGS. 8A and 9A, the selecting circuits 45a to 45i separate data 1 to data 11 into a plurality of groups in different times 1, 2, and 3 by the controlling circuit 46 and substitute one data of a group which varies from time to time with additional data for code transformation. Thus, the low order data following the position of the additional data are successively shifted down. The resultant data is generated for each group.

In FIGS. 8A and 9B, the plurality of parallel-serial transforming circuits 31a to 31c successively read data of the same group and transfer the resultant data as encoded data of the plurality of transmission lines to the fiber lines 1 to 3 in parallel. Since the position in which the additional bit (frame information F) is inserted deviates from line to line as shown in FIGS. 9A and 9B, the encoded data shown in FIG. 3 can be obtained.

Figure 8B:
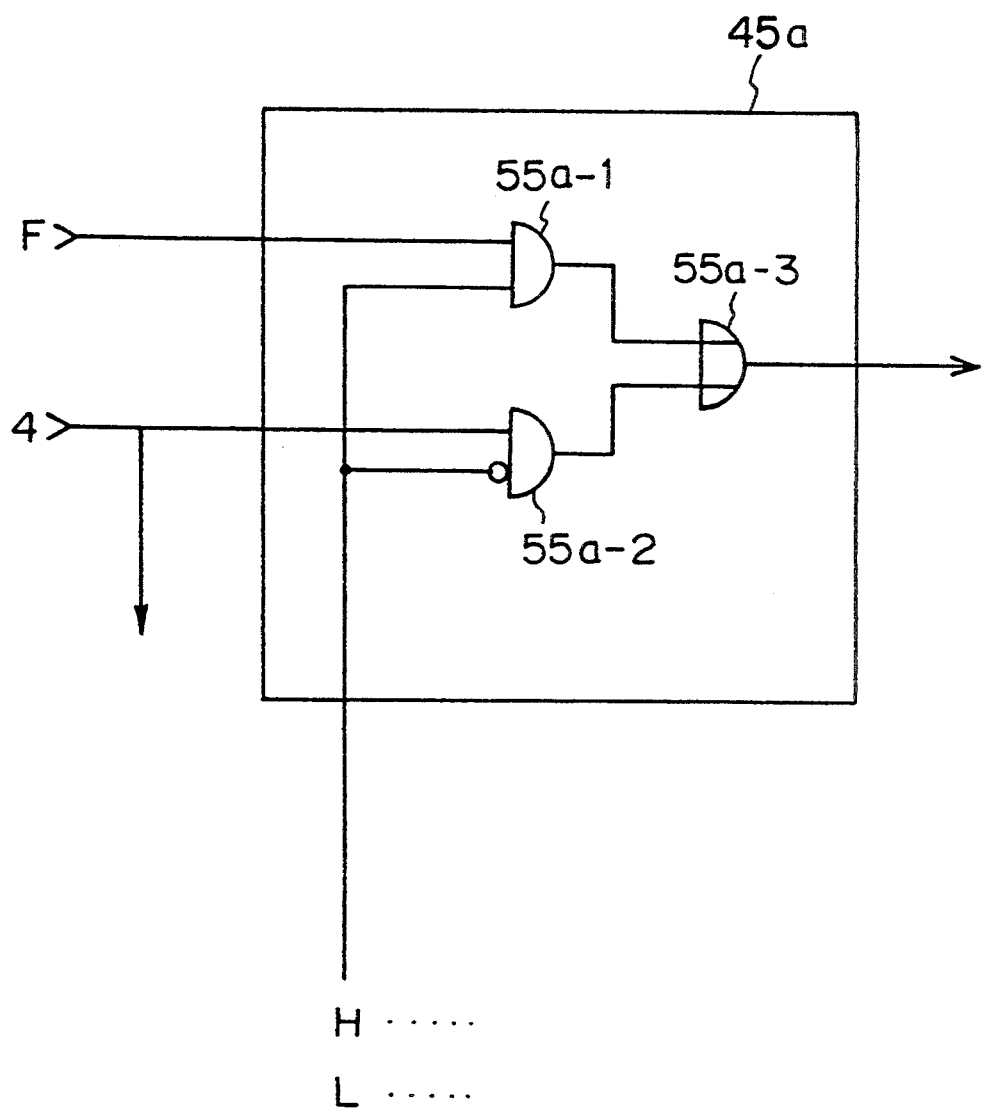

FIG. 8B shows the configuration of the above described selecting circuit 45a.

Signal F is inputted to one receiving terminal of the AND circuit 45a-1 in the selecting circuit 45a. To another receiving terminal, a selection signal is inputted from the controlling circuit 46 shown in FIG. 8A. Signal 4 is inputted to one receiving terminal of another AND circuit 45a-2 in the selecting circuit 45a, and to another receiving terminal, an inverted selection signal is inputted from the controlling circuit 46 shown in FIG. 8A. The OR circuit 45a-3 receives the outputs from the above described AND circuits 45a-1 and 45a-2.

Therefore, when the selection signal from the controlling circuit 46 shows "H" level, signal 4 is interrupted in the AND circuit 45a-2, and signal F is outputted to the selecting circuit 45a through the AND circuit 45a-1 and the OR circuit 45a-3.

When the selection signal from the controlling circuit 46 shows "L" level, signal F is interrupted in the AND circuit 45a-1, and signal 4 is outputted to the selecting circuit 45a through the AND circuit 45a-2 and the OR circuit 45a-3.

The configuration of the selecting circuit 45a is the same as that in the selecting circuits 45b–45i. Therefore, when signal F is selected by the selecting circuit 45a, signals 4–11 are sequentially processed in the following selecting circuits (FIG. 8A). The controlling circuit 46 has two signal lines (not shown in FIG. 8A), one of which is connected to the selecting circuits 45a–45e, and the other of which is connected to the selecting circuits 45e–45i. When the selection signal in one signal line indicates "L" level and signal 4 is selected by the selecting circuit 45a, signal F is selected by the selecting circuit 45e if the selection signal of the other signal line indicates "H" level, and signal F is selected by the selecting circuit 45i if it indicates "L" level.

Figure 10:
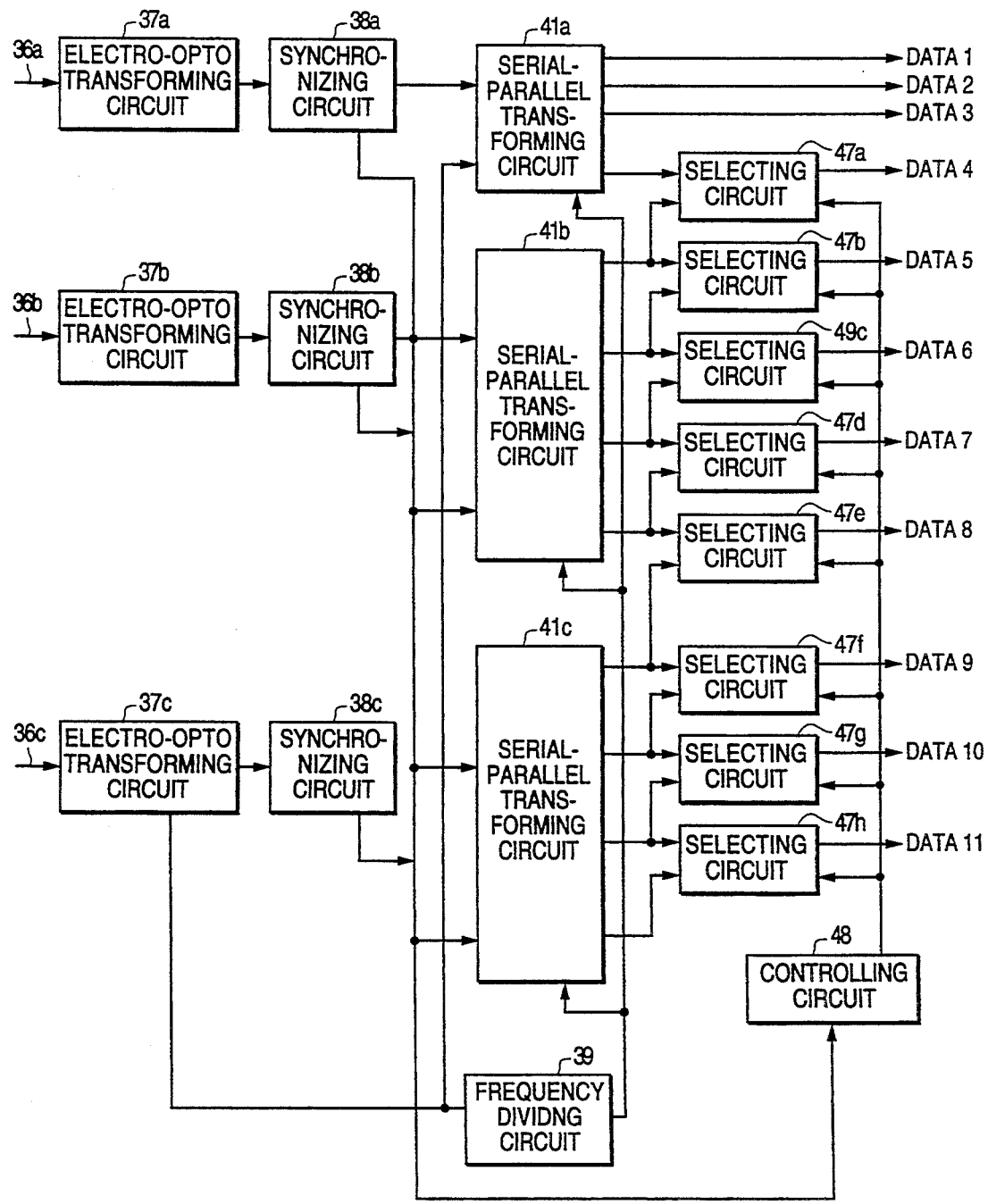
FIG. 10 is a block diagram showing the construction of a receiving portion of the fourth embodiment.

FIG. 10 shows the construction of a receiving portion in accordance with the transmitting portion shown in FIG. 8A. In this case, for simplicity, in FIG. 10, the same portions as FIG. 4 use the same reference numerals thereof. Reference numerals 47a to 47h are selecting circuits. Reference numeral 48 is a controlling circuit for controlling the selection of an input of each selecting circuit 47a–47h.

The opto-electro transforming circuits 37a to 37c transform optical signals from the optical fiber lines 36a to 36c into electric signals. The synchronizing circuits 38a to 38c synchronize these signals (multiplexed data) by using frame information (F) contained therein and output the resultant signals to the plurality of serial-parallel transforming circuits 41a to 41c. The serial-parallel transforming circuits 41a to 41c successively transform the multiplexed data received from the fiber lines into parallel data. The selecting circuits 47a to 47h perform the reverse processes of the multiplexing process and the encoding process shown in FIG. 9 under the control of the controlling circuit 48. In other words, the selecting circuits 47a to 47h remove the additional data from the parallel data of the same group and shift up the low order data. Thus, parallel data of data 1 to data 4, data 5 to data 8, and data 9 to data 11 are generated.

Figure 11:
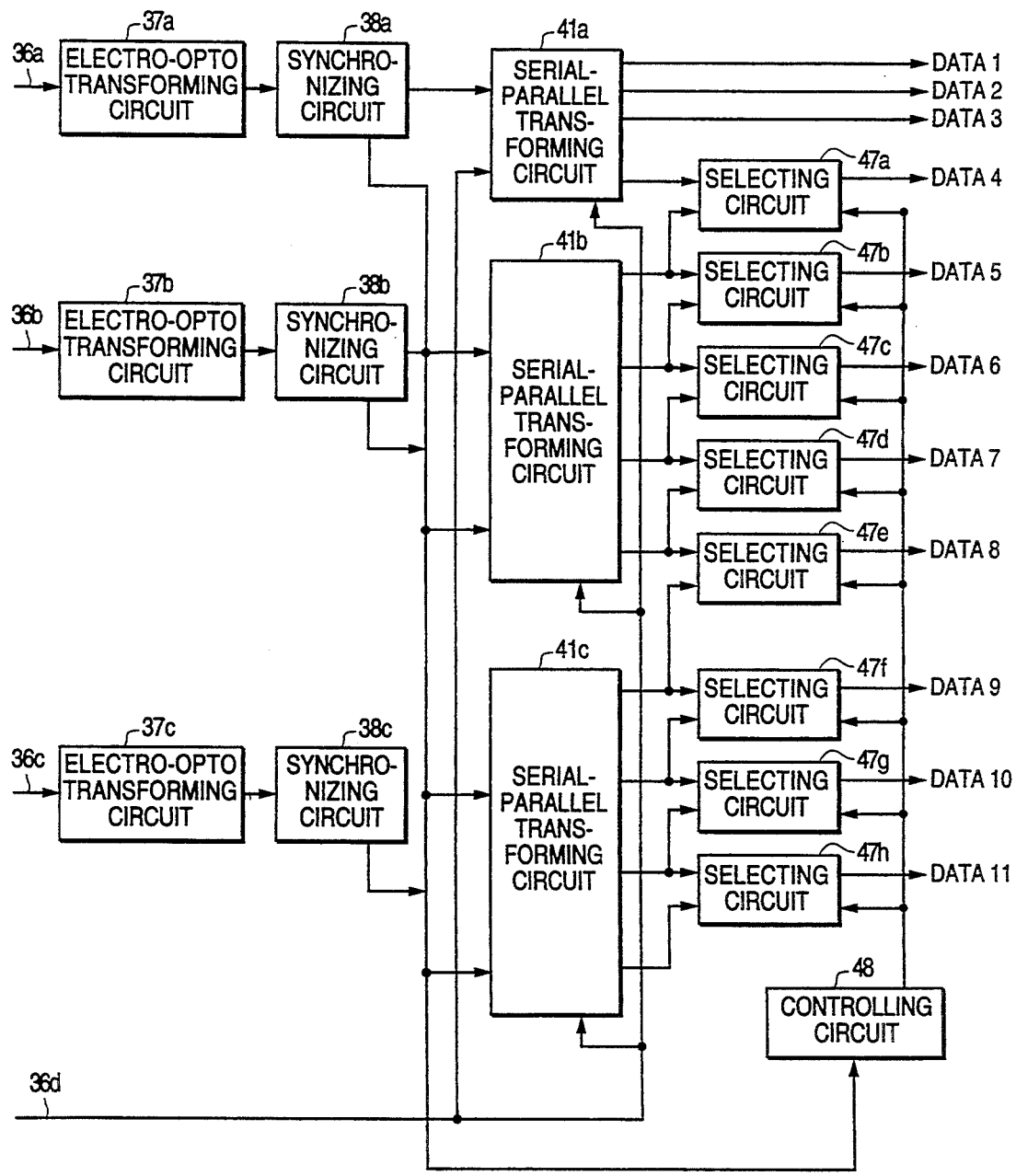
FIG. 11 is a block diagram showing the construction of a receiving portion according to a fifth embodiment of the present invention.

Moreover, as a fifth embodiment of the present invention, the following construction is available. Instead of extracting the clock from the receiving portion as described in the fourth embodiment shown in FIG. 10, the clock signal is transmitted over an optical fiber line 36d as shown in FIG. 11. The clock signal can be used in the decoding portion of the receiving portion. This construction can be applied to the second embodiment shown in FIG. 4 and the third embodiment shown in FIG. 5.

Thus, since the clock extracting circuit can be omitted in the receiving portion, the circuit scale of the apparatus can be reduced.

In addition, when information necessary for detecting the position of the additional bit (frame information F) is transmitted over another line, the synchronizing process for signals of each transmission line can be omitted in the receiving portion. In this construction, since the synchronizing circuits can also be omitted, the circuit scale of the apparatus can be further reduced. In addition, since the time necessary for the synchronizing process is not necessary, the process speed can be further improved.

Figure 12:
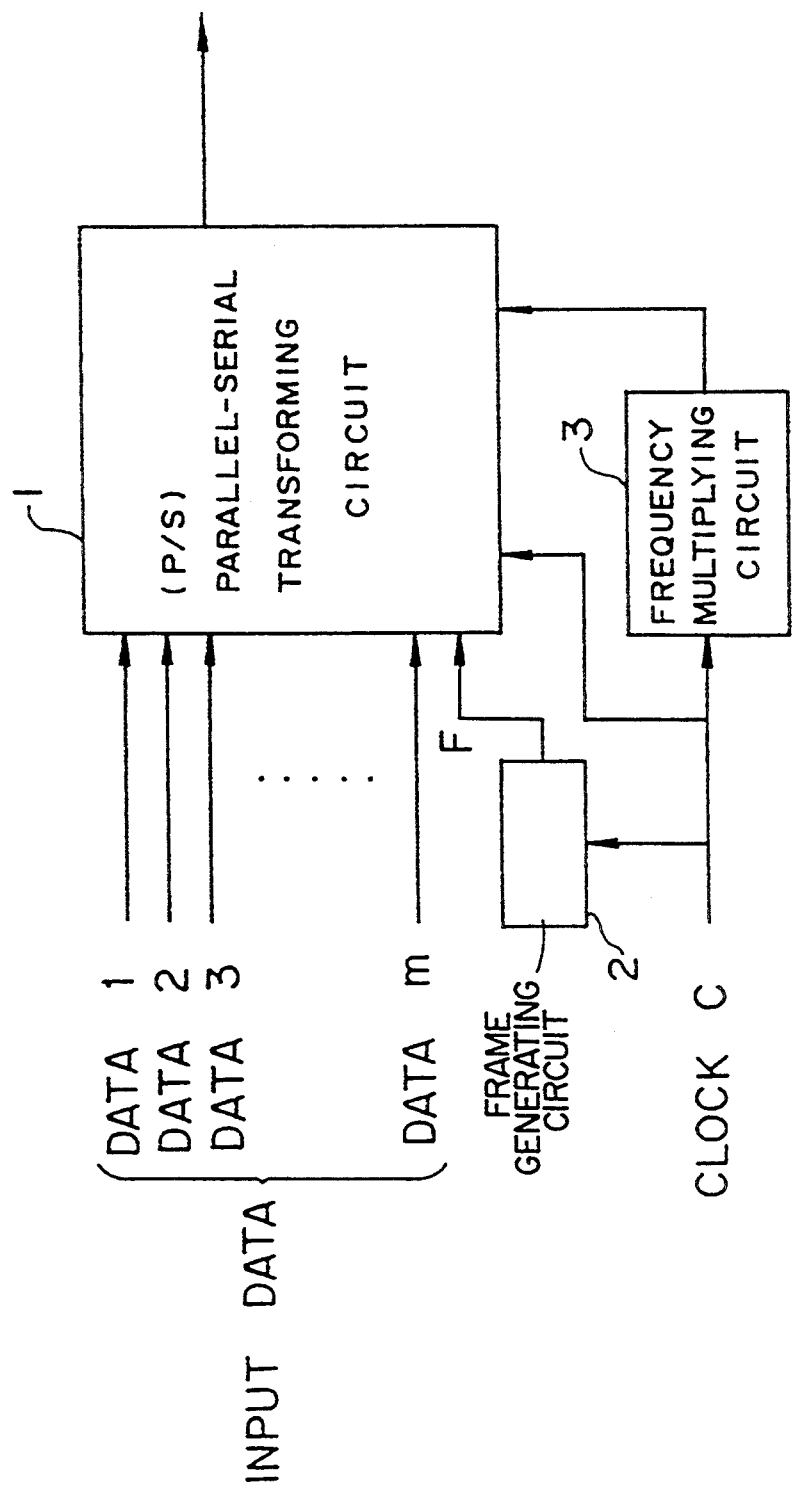
FIG. 12 is a block diagram describing a parallel-serial transforming circuit of a transmitting portion.

Next, the construction and the basic operation of the parallel-serial transforming circuits which perform both the multiplexing process and the encoding process in the transmitting portion will be described as the sixth embodiment. A parallel-serial transforming circuit of the transmitting portion is shown in FIG. 12. The operational time chart of the parallel-serial transforming circuit 1 is shown in FIGS. 13A–E. In these figures, input data is parallel data of m (=p) bits.

FIG. 12 shows the parallel-serial transforming circuit 1, the frame information generating portion 2, the clock frequency multiplying circuit 3, and the data substituting circuit 4.

Figure 13:
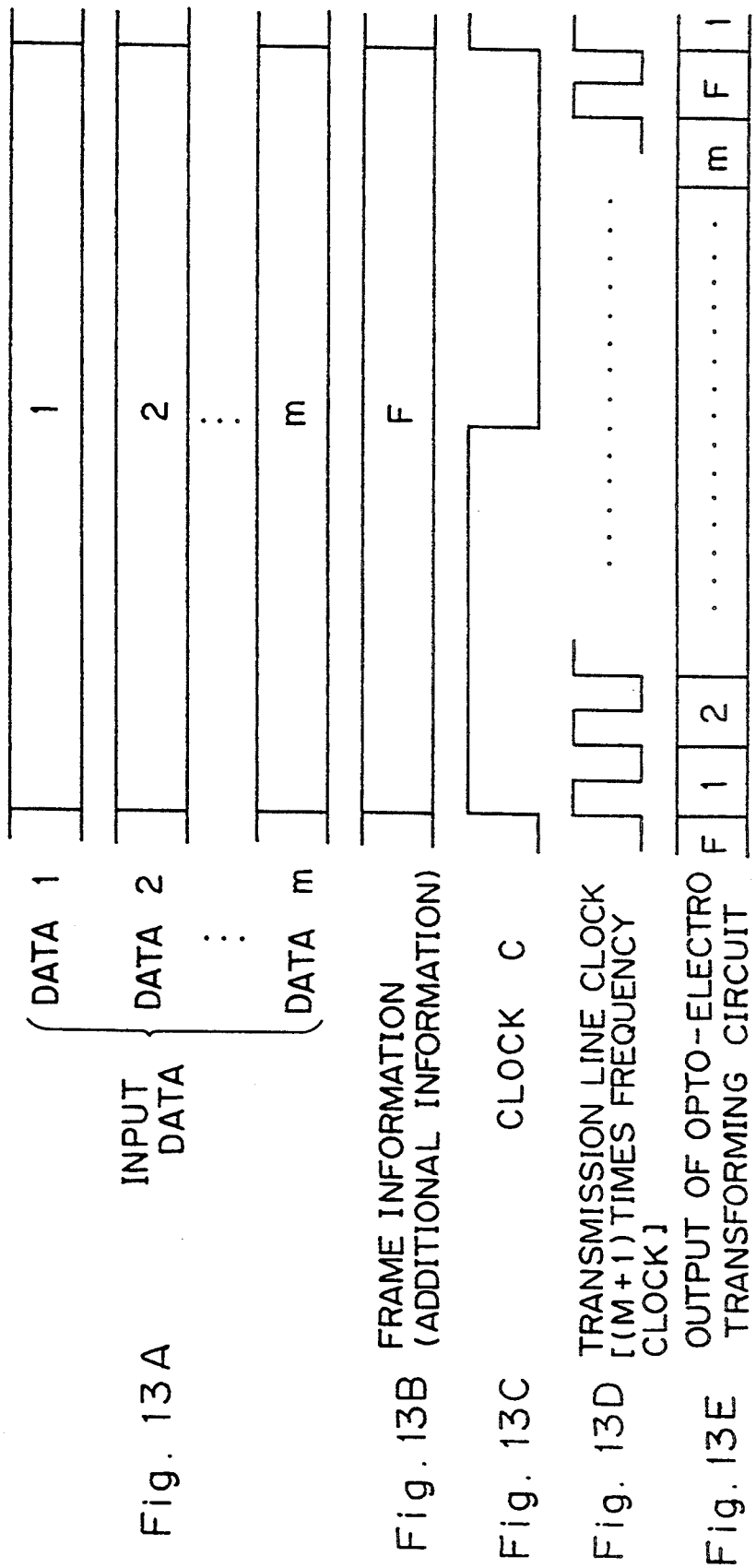
FIGS. 13A–13E are timing charts showing the operation of the parallel-serial transforming circuit of the transmitting portion.

With reference to the timing chart shown in FIG. 13A to E, the operation of the transmitting portion will be described. First, data of m bits, which are data 1, data 2, . . . , and data m, shown in FIG. 13A are input to the parallel-serial transforming circuit 1. In addition, frame information F where the frequency of a clock C is divided by 2 as shown in FIG. 13B is sent from the frame information generating portion 2 to the parallel-serial transforming circuit 1. Thus, a total of m+1 bits of data, which are data 1, data 2, . . . , data m, and additional code of frame information F, are input to the parallel-serial transforming circuit.

On the other hand, the frequency multiplying circuit 3 supplies a multiplexing clock C where the frequency of the clock C is multiplied by (m+1) as shown in FIG. 13D to the parallel-serial transforming circuit 1 as a transmission line clock shown in FIG. 13D. With the transmission line clock ×(m+1), the parallel-serial transforming circuit 1 outputs serial data where data 1, data 2, . . . , data m, and additional code F are multiplexed as shown in FIG. 13E.

As described above, by multiplexing input data along with a signal newly inserted (additional code), the multiplexing process and the encoding process can be performed at the same time.

Next, the construction and the basic operation of the serial-parallel transforming circuits of the receiving portion of the sixth embodiment will be described. FIG.

Figure 15:
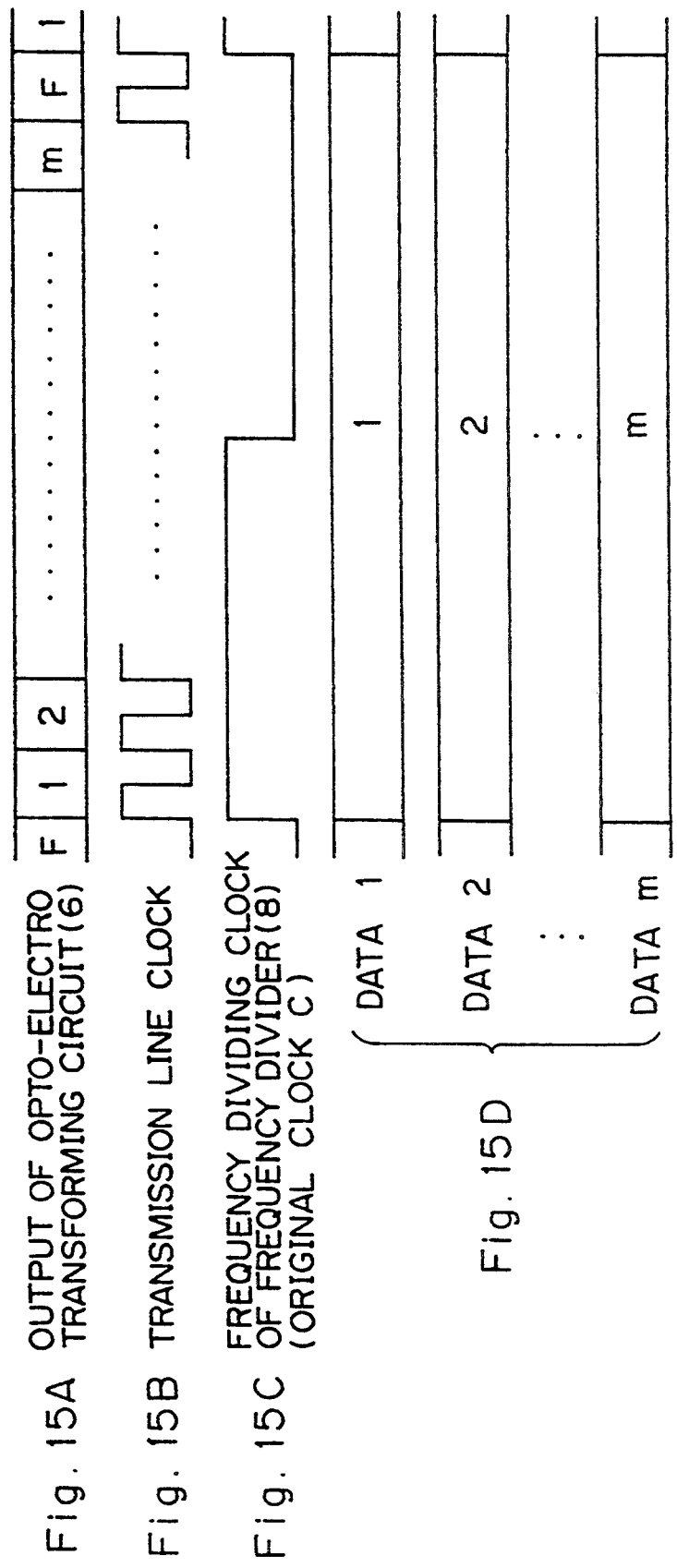
FIGS. 15A–15D are timing charts showing the operation of the serial-parallel transforming circuit of a receiving portion.

14 shows its configuration, and FIG. 15 shows the operational time chart thereof.

Figure 14:
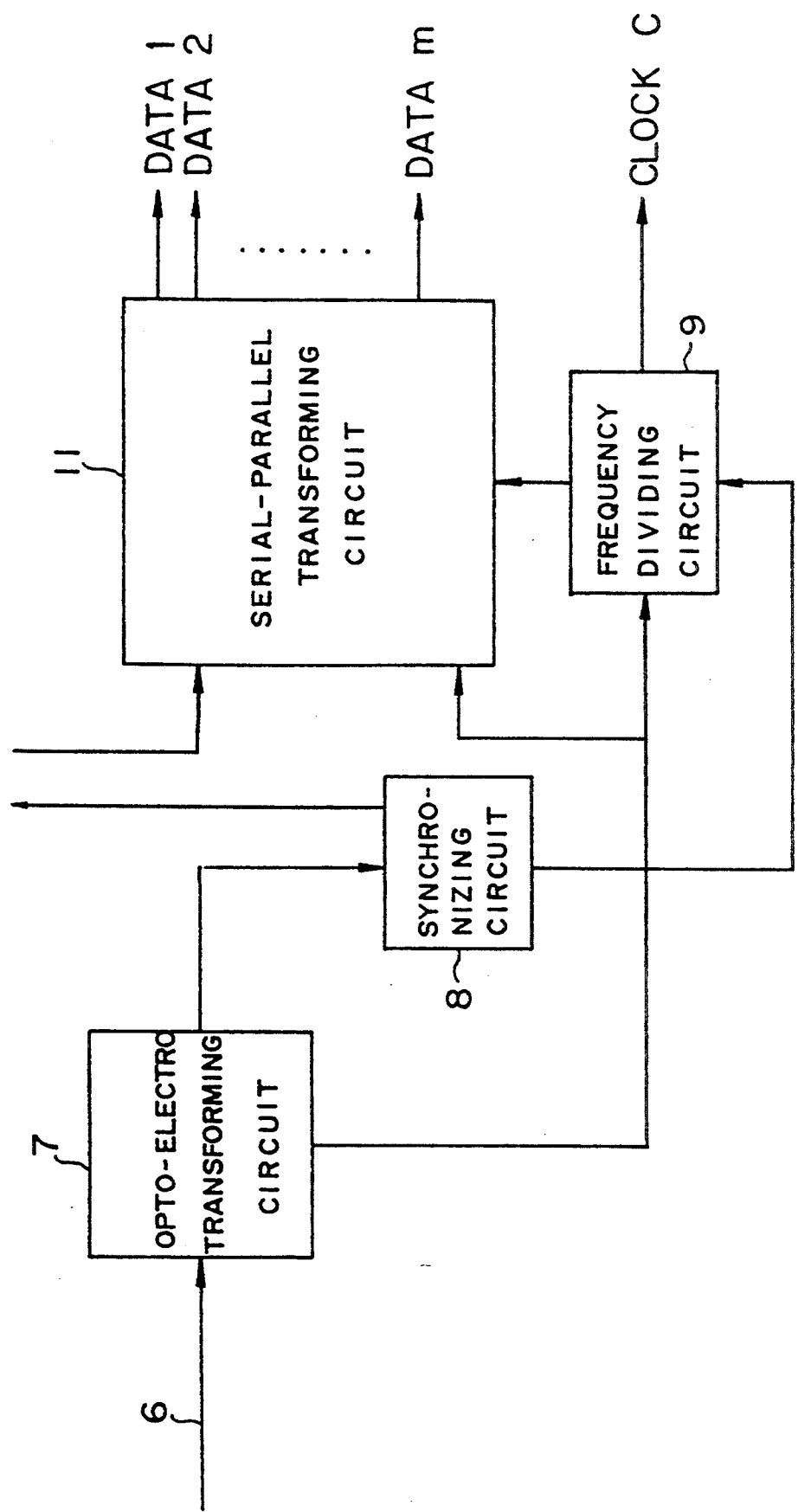
FIG. 14 is a block diagram describing a serial-parallel transforming circuit of a receiving portion according to a sixth embodiment of the present invention.

FIG. 14 shows the construction of the optical fiber line 6, the opto-electro transforming circuit 7, the synchronizing circuit 8, the frequency dividing circuit 9, and the serial-parallel transforming circuit 11.

Next, the operation of the receiving portion in this construction will be described with reference to the timing chart shown in FIGS. 15A to 15D. First, the opto-electro transforming circuit 7 transforms a multiplexed signal received through the optical fiber line 6 into an electric signal and outputs the resultant signal as multiplexed serial data as shown in FIG. 15A. In addition, the opto-electro transforming circuit 7 transforms the transmission line clock where the frequency of the original clock is multiplied by (m+1) into an electric signal and outputs the resultant signal as a multiplexing clock as shown in FIG. 15B.

The synchronizing circuit 8 extracts the position information of additional code in the serial data, that is, the frame information F, and outputs this information to the frequency dividing circuit 9. The frequency dividing circuit 9 divides the frequency of the multiplexing clock by (m+1) and reproduces the original clock C corresponding to the input data 1 to input data m. With respect to the multiplexed serial data, the output phase of the reproduced clock C shown in FIG. 15C is determined with the frame information F detected by the synchronizing circuit 8. The serial-parallel transforming circuit 11 removes the additional code data from the serial data and outputs parallel data of data 1 to data m.

As described above, in the transmitting portion, data is encoded by inserting (adding) the frame signal. In the receiving portion, the data is decoded by removing the frame signal. With the original clock, the output serial signal of each transmission line is transformed into parallel data.

Figure 16:
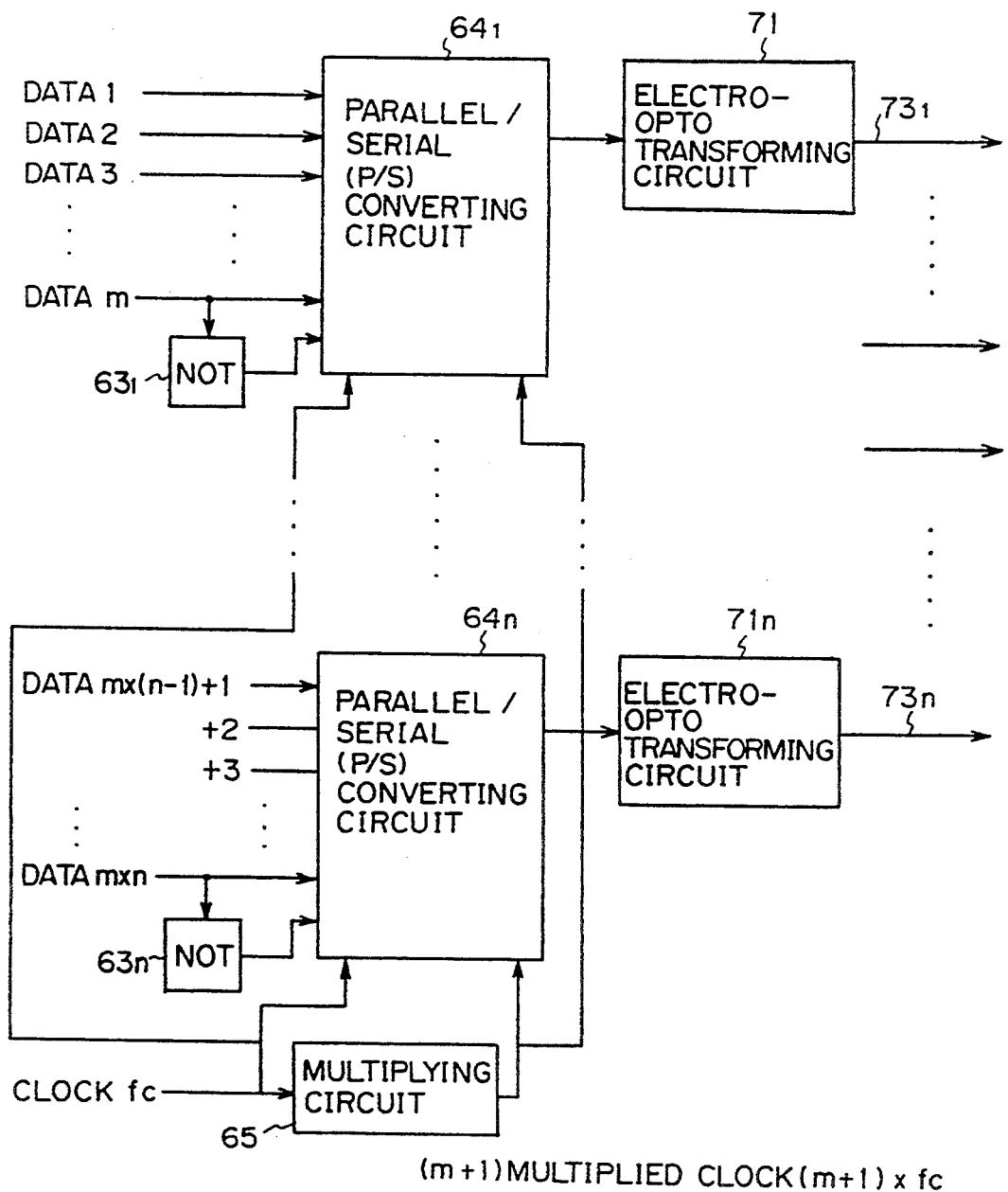
FIG. 16 shows the configuration of the sending equipment according to a seventh embodiment of the present invention.

The above described sixth embodiment refers to one optical fiber of a transmission line. The transmission line of n optical fibers (n indicates a positive integer) is described as the seventh embodiment (that is, a parallel transmission at an optical level). In this case, the sending equipment is configured as shown in FIG. 16. That is, the NOT circuit shown in FIGS.2A–2C is used instead of the frame generating circuit 2, and the P/S transforming circuit is provided with the electro-optical transforming circuit and the optical fibers such that they are configured as the NOT circuit $23_1$–$23_n$, the P/S converting circuit $24_1$–$24_n$, the transforming circuit $31_1$–$31_n$, and the optical fiber $33_1$–$33_n$ each being provided in n units in parallel. The multiplying circuit 3 shown in FIG. 12 is shared in the configuration.

Figure 17:
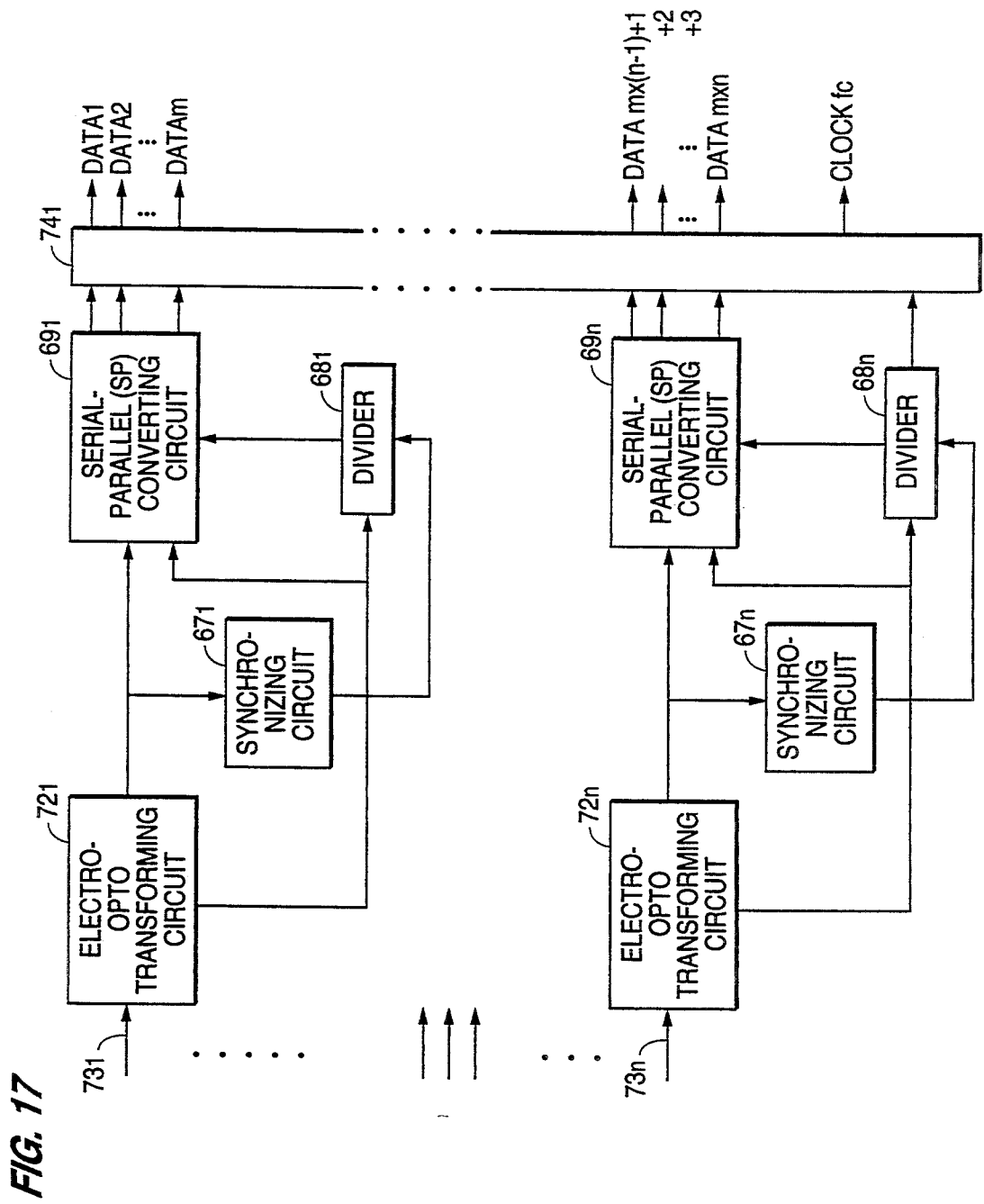
FIG. 17 shows the configuration of the receiving equipment of the seventh embodiment.
Figure 18:
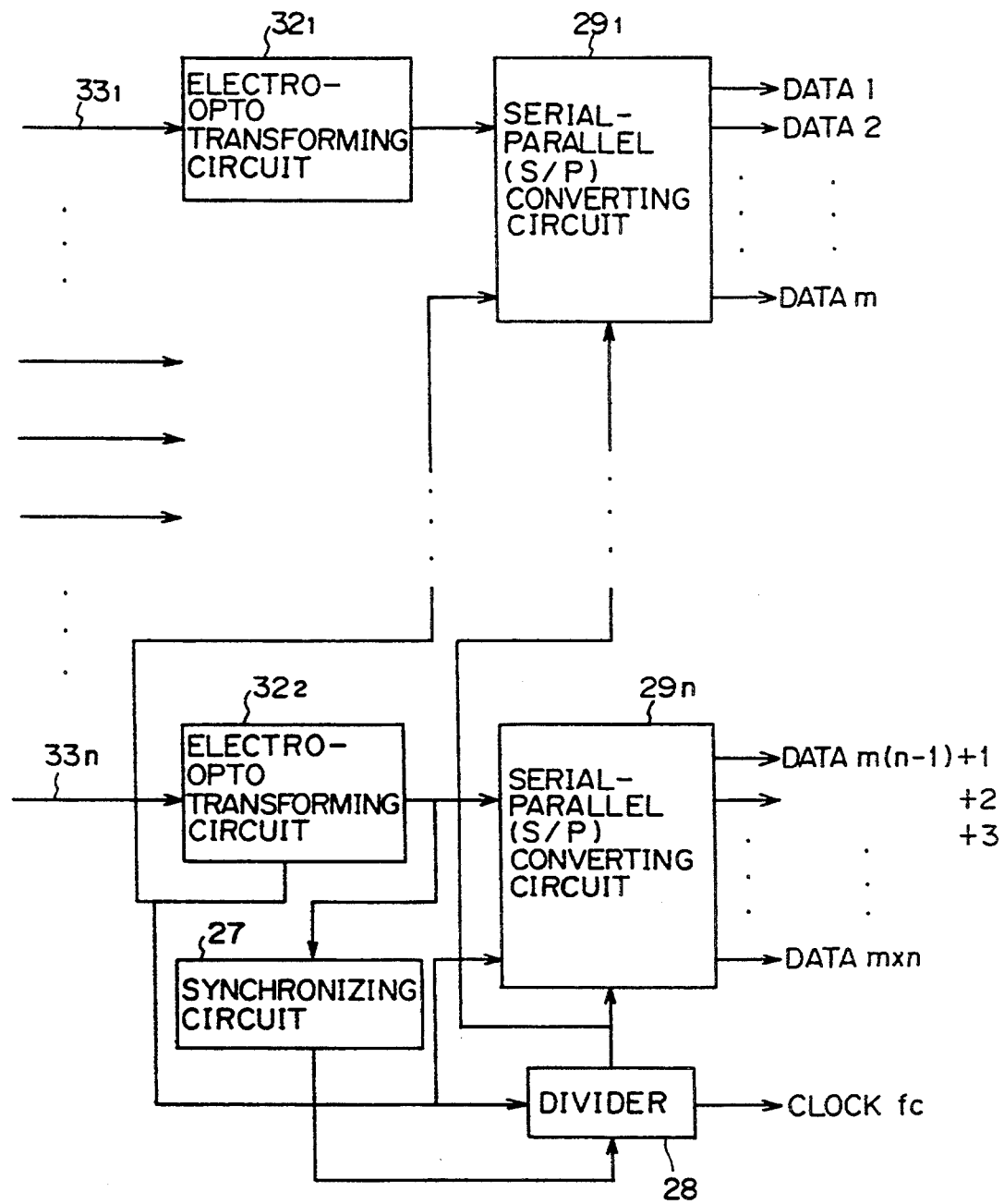
FIG. 18 shows another configuration sample of the receiving equipment of the seventh embodiment.

The receiving equipment corresponding to the above described sending equipment is configured as shown in FIGS. 17 and 18.

In the configuration shown in FIG. 17, the electro-opto transforming circuits $72_1$–$72_n$ are provided corresponding to the optical fiber $73_1$–$73_n$. Similarly, the synchronizing circuits $67_1$–$67_n$, the dividers $68_1$–$68_n$, and the S/P converting circuits $69_1$–$69_n$ are provided in the configuration. That is, in the configuration shown in FIG. 17, the receiving equipment comprising one optical fiber 73 is increased to n units and arranged in parallel. In this case, since the final data must be outputted as synchronizing with the same clock, the latch circuit 34 is provided at the output side of each of the S/P converting circuits $69_1$–$69_n$.

The signs in the transmission line are processed in the above described configuration of the sending and receiving equipments in the same operation, but in n units in parallel.

The configuration of the receiving equipment shown in FIG. 18 is different from that shown in FIG. 8A–8B in that it shares the divider 28 and the synchronizing circuit 27. As described above, the synchronizing circuit 27 detects the relative position of other data by locating a complementary sign in the multiplexed data, and transmits the detection result to the divider 28. In this embodiment, the data from other optical fibers $33_1$–$33_n$ are synchronized and S/P converted according to the synchronization result obtained by converting the data transmitted through the optical fiber $33_n$ to an electric signal by the electro opto transforming circuit $32_n$ and the extracted clock. Therefore, in this case, the latch circuit 34 shown in FIGS. 8A–8B is not required.

It should be appreciated that although the parallel transmission system and the apparatus of the present invention are especially suitable for the high speed parallel transmission using opto-electronic technologies, the present invention can be applied to other applications.

Although the present invention has been shown and described with respect to a best mode embodiment thereof, it should be understood by those skilled in the art that the foregoing and various other changes, omissions, and additions in the form and detail thereof may be made therein without departing form the spirit and scope of the present invention.

Figure 19:
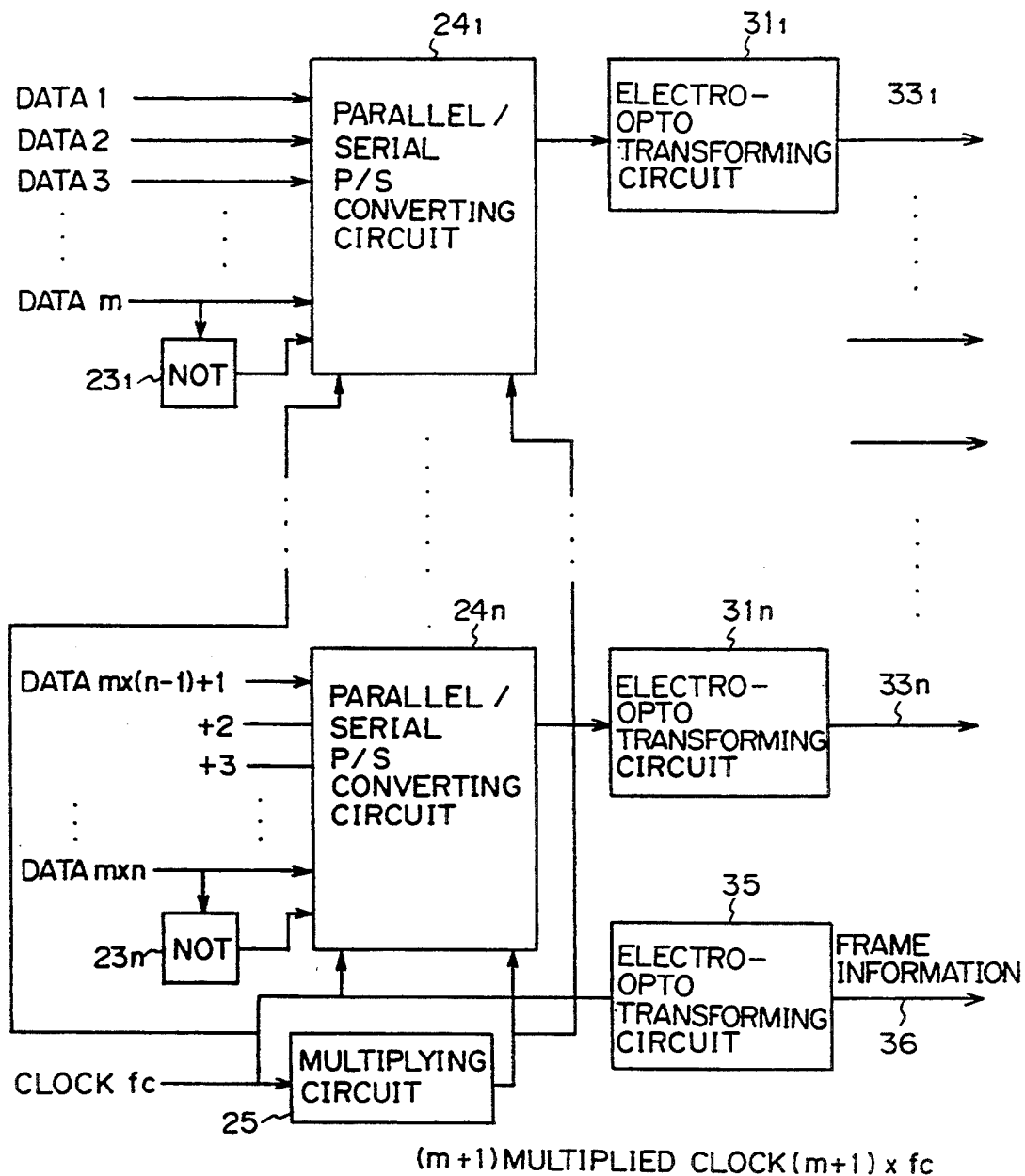
FIG. 19 shows the configuration of the sending equipment according to the eighth embodiment of the present invention.

Next, the eighth embodiment is explained below. The explanation up to the seventh embodiment describes how to realize the synchronization of data frames in the synchronous circuit provided in the receiving unit. However, as for the parallel transmission at an optical level, a frame signal itself can be transmitted through optical fibers. The necessary configurations of the sending and the receiving equipments are shown in FIGS. 19 and 20 respectively.

In the eighth embodiment, frame information is sent through optical fibers from a sending equipment, thereby requiring no synchronous circuits for synchronizing frames in a receiving equipment. As shown in FIG. 19, the sending equipment comprises n sending units as in the seventh embodiment, that is, n NOT circuits $23_1$–$23_n$, n P/S converting circuits $24_1$–$24_n$, n electro-opto transforming circuit $31_1$–$31_n$, and a shared multiplying circuit 25. Additionally, the eighth embodiment comprises an electro-opto transforming circuit 35 for converting frame information to an optical signal, and an optical fiber 36 for transmitting to the receiving equipment the frame information converted to the optical signal.

Figure 20:
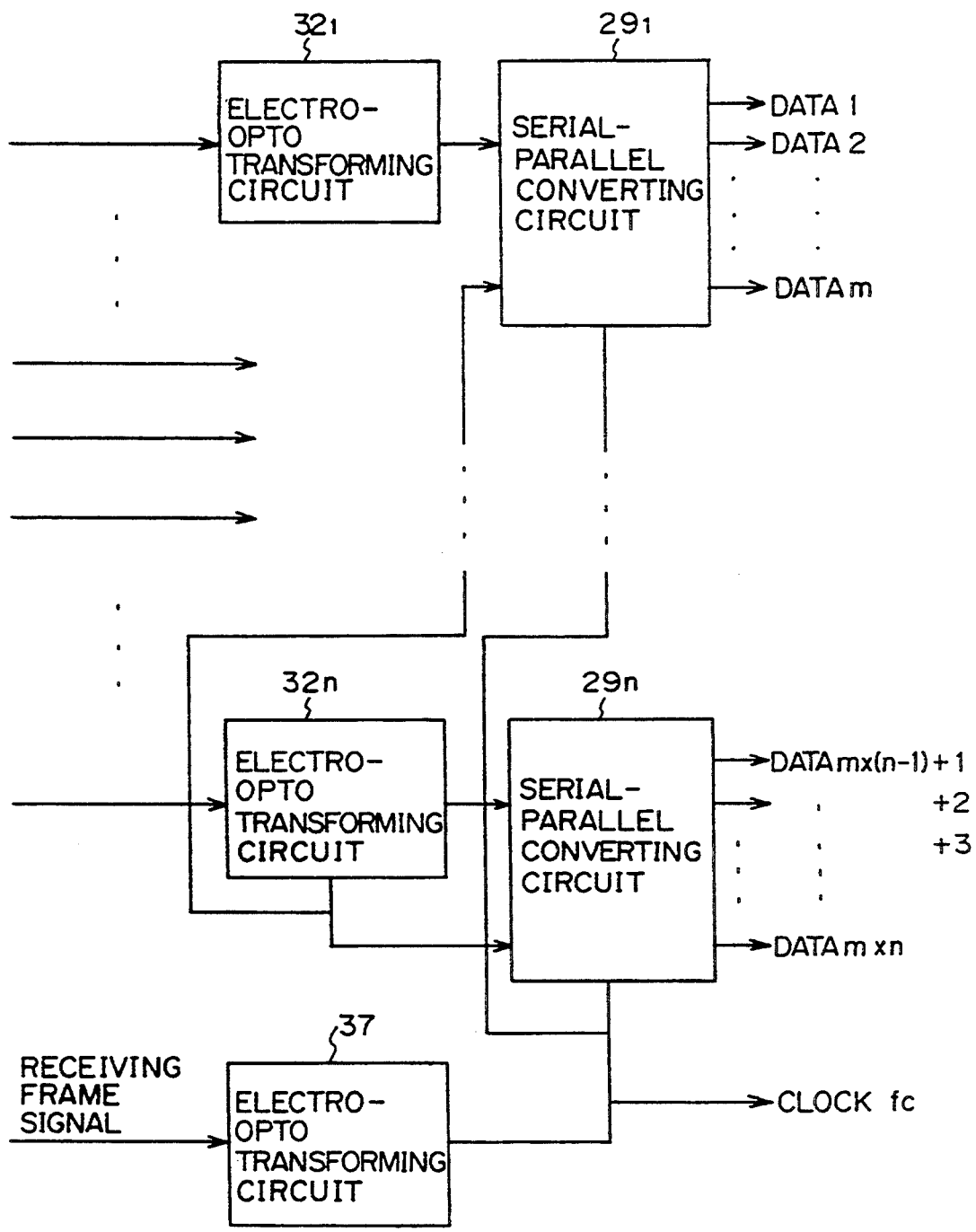
FIG. 20 shows the configuration of the receiving equipment of the eighth embodiment.

The receiving equipment in FIG. 20 comprises n electro opto transforming circuits $32_1$–$32_n$, n S/P converting circuits $29_1$–$29_n$, and an electro-opto transforming circuit 37 for converting the frame information received from the above described sending equipment to an electric signal.

Thus, by sending frame information from the sending equipment, the receiving equipment requires no synchronization restoring time taken for synchronizing frames can be reduced to zero.

In the present embodiment, a transmission code can be an mB1C (m bit+one complementary code), an mB1F (m bit+one frame signal), or an mB1P code having a parity signal P for a signal 1−m. That is, the code can comprise m bits and an additional 1 bit to form a transmission code applied to the present invention. Besides, m bits and additional n bits (n indicates a positive integer larger than 1) instead of m bits and an additional 1 bit can be applied to the present embodiment as long as the frequency of the multiplexed clock equals the value obtained by multiplying the value of the input data clock by "m+n".

Figure 21:
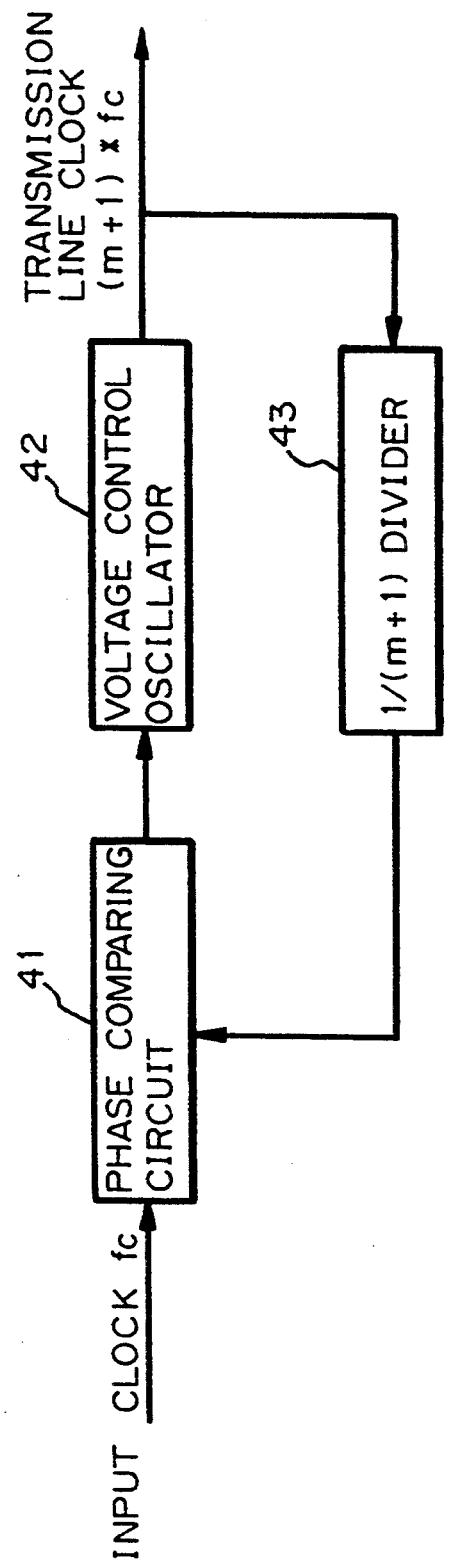
FIG. 21 shows the configuration of the multiplying circuit using a PLL loop.

Furthermore, a transmission line clock in accordance with the frequency and phase of an input clock can be obtained for the purpose of improved stability by replacing a multiplying circuit for obtaining a multiple of a transmission line clock according to an input data clock with a PLL loop (phase synchronous loop). FIG. 21 shows the configuration of the multiplying circuit. In FIG. 21, 41 is a phase comparing circuit, 42 is a voltage control oscillator, and 43 is a 1/(m+1) divider. In the configuration, a transmission line code is inserted as an additional bit for every m-th bit.

What is claimed is:

1. A parallel transmission method, including a transmitting portion submethod for transmitting parallel data of a plurality of channels as encoded data of a plurality of lines and a receiving portion submethod for decoding parallel data of a plurality of lines from encoded data of said plurality of channels, said transmitting portion submethod comprising the steps of:
 a1) multiplying the frequency of a clock by a predetermined number so as to generate a multiplexing clock;
 b2) separating input signals comprised of parallel data of a plurality of channels and additional data for code transformation into a plurality of groups;
 c1) transforming parallel data into serial data with the multiplexing clock;
 d1) mutually substituting the resultant data of the plurality of channels from time to time; and
 e1) generating encoded data containing the additional data of the plurality of lines; and said receiving portion submethod comprising the steps of:
 a2) synchronizing encoded data of the plurality of lines with the additional data;
 b2) substituting the resultant data of the plurality of lines in an inverse order of the transmitting portion;
 c2) removing the additional data from the resultant data;
 d2) successively arranging the resultant data of each group;
 e2) dividing the frequency of a transmission line clock by a predetermined number to generate an original clock; and
 f2) transforming serial data of each group into parallel data.

2. A parallel transmission method, comprising a transmitting portion submethod for transmitting parallel data of a plurality of channels as encoded data of a plurality of lines and a receiving portion submethod for decoding parallel data of a plurality of lines from encoded data of the plurality of channels, said transmitting portion submethod comprising the steps of:
 a1) separating parallel data of a plurality of channels into a plurality of groups;
 b1) substituting one data of each group with additional data for code transformation;
 c1) shifting down low order data following the additional data to generate a plurality of data set in succession;
 d1) multiplying the frequency of a clock by a predetermined number to generate a multiplexing clock; and
 e1) transforming serial data of the same group of the plurality of data sets into serial data with the multiplexing clock in succession; and said receiving portion submethod, comprising the steps of:
 a2) synchronizing encoded data of the plurality of lines with the additional data;
 b2) dividing the frequency of a transmission line clock by a predetermined number to generate an original clock;
 c2) transforming the resultant serial data of the plurality of lines into parallel data;
 d2) removing the additional data from the parallel data of the same group of each channel; and
 e2) shifting up the low order data.

3. A parallel transmission apparatus, comprising a transmitting portion for transmitting parallel data of a plurality of channels as encoded data of a plurality of lines and a receiving portion for decoding parallel data of a plurality of lines from encoded data of the plurality of channels, said transmitting portion comprising:

a frequency multiplying circuit for multiplying the frequency of a clock to generate a multiplexing clock;

a plurality of parallel-serial transforming circuits for separating input signals composed of parallel data of a plurality of channels and additional data for code transformation into a plurality of groups and for transforming the parallel data into serial data with said multiplexing clock; and a first data substituting circuit for mutually substituting the data of said plurality of channels of said plurality of parallel-serial transforming circuits in succession and for generating encoded data containing said additional data of said plurality of lines; and said receiving portion comprises:

a plurality of synchronizing circuits for synchronizing encoded data of said plurality of lines with said additional data;

a second data substituting circuit for substituting the encoded data of said plurality of lines in the reverse order of said transmitting portion and for removing said additional data from the encoded data;

arranging the data of each group in succession;

a frequency dividing circuit for dividing the frequency of a transmission line clock and for generating an original clock; and a plurality of serial-parallel transforming circuits for transforming the output signals of each group into parallel data with said clock.

4. The parallel transmission apparatus as set forth in claim 3, wherein the clock of said receiving portion is transmitted in parallel from said transmitting portion over a different line from that for code transmission lines.

5. The parallel transmission apparatus as set forth in claim 3, wherein position information of said additional data is transmitted from said transmitting portion over a different line from that for code transmission lines.

6. A parallel transmission apparatus, comprising a transmitting portion for transmitting parallel data of a plurality of channels as encoded data of a plurality of lines and a receiving portion for decoding parallel data of a plurality of channels from encoded data of the plurality of channels, said transmitting portion comprises:
- a plurality of first selecting circuits for separating parallel data of a plurality of channels into a plurality of groups, for substituting one data of each group with additional data for code transformation, and for successively shifting down low order data following said additional data so as to generate a plurality of data sets;
- a frequency multiplying circuit for multiplying the frequency of a clock to generate a multiplexing clock; and
- a plurality of parallel-serial transforming circuits for transforming parallel data of the same group of said plurality of data sets into serial data with said multiplexing clock in succession; and said receiving portion comprises:
- a plurality of synchronizing circuits for synchronizing encoded data of said plurality of lines with said additional data;
- a frequency dividing circuit for dividing the frequency of a transmission line clock by a predetermined number to generate an original clock;
- a plurality of serial-parallel transforming circuits for transforming the serial data of said plurality of lines into parallel data; and
- a plurality of second selecting circuits for removing said additional data from the data of the same group of each line and for shifting up the low order data following said additional data.

7. The parallel transmission apparatus as disclosed in claim 6, wherein the clock of said receiving portion is transmitted from said transmitting portion over a line different from that for code transmission lines.

8. The parallel transmission apparatus as disclosed in claim 6, wherein position information of said additional data is transmitted from said transmitting portion over a line different from that for code transmission lines.

9. A transmission line encoding method according to claim 1, wherein said transmitting portion submethod further comprises the step of:
- using a phase synchronous loop comprising an oscillator, said phase synchronous loop generating a transmission-line clock by multiplying an original clock of an input signal by an integer.

10. A transmission line encoding method according to claim 2, wherein said transmitting portion submethod further comprises the step of:
- using a phase synchronous loop comprising an oscillator, said phase synchronous loop generating a transmission-line clock by multiplying an original clock of an input signal by an integer.

11. A parallel transmission apparatus as claimed in claim 3, wherein said transmitting portion further comprises a phase synchronous loop comprising an oscillator, said phase synchronous loop generating a transmission-line clock by multiplying an original clock of an input signal by an integer.

12. A parallel transmission apparatus as claimed in claim 6, wherein said transmitting portion further comprises a phase synchronous loop comprising an oscillator, said phase synchronous loop generating a transmission-line clock by multiplying an original clock of an input signal by an integer.

13. A transmission apparatus comprising:
a sending device for sending a plurality of parallel data as encoded data of a plurality of channels, said device comprising:
- multiplexed clock generating means for generating a multiplexed clock by multiplying an original clock;
- adding means for adding additional data to a plurality of input parallel data for use in converting codes;
- group dividing means for dividing an input signal provided with the additional data by said adding means into a plurality of groups;
- parallel-serial converting means for parallel-serial-converting using said multiplexed clock as the input signal divided by said group dividing means;
- encoded data generating means for generating encoded data of a plurality of channels each containing a conversion result of a group assigned said additional data after changing, in time series, results of a plurality of parallel-serial conversions performed by said parallel-serial converting means; and
- transmission data outputting means for outputting the encoded data of the plurality of channels according to the multiplexed clock.

14. A transmission apparatus comprising:
a receiving device for decoding plural pieces of parallel data from received encoded data of a plurality of channels, said receiving device comprising:
- synchronizing means for synchronizing the encoded data of the plurality of channels using additional data added to the encoded data;
- changing means for changing the encoded data of the plurality of channels synchronized by said synchronizing means in a predetermined order;
- arraying means for arraying each group of originally received data in time series after removing the additional data from the encoded data changed by said changing means;
- original clock generating means for generating an original clock by dividing a transmission line clock; and
- received data outputting means for serial-parallel converting and outputting an output signal of each group according to the original clock.

* * * * *

UNITED STATES PATENT AND TRADEMARK OFFICE
CERTIFICATE OF CORRECTION

PATENT NO. : 5,426,644
DATED : June 20, 1995
INVENTOR(S) : Fujimoto

It is certified that error appears in the above-indentified patent and that said Letters Patent is hereby corrected as shown below:

Col. 3, line 24, delete "of" second occurrence.
line 32, delete "of" second occurrence.
line 51, change "FIG." to --FIGS.--.

Col. 6, line 34, change "311" to --3/1--.

Signed and Sealed this

Seventeenth Day of October, 1995

Attest:

BRUCE LEHMAN

Attesting Officer

Commissioner of Patents and Trademarks